US011458507B2

(12) United States Patent
Wagner et al.

(10) Patent No.: US 11,458,507 B2
(45) Date of Patent: *Oct. 4, 2022

(54) SYSTEMS AND METHODS FOR DYNAMIC PROCESSING OF OBJECTS

(71) Applicant: Berkshire Grey Operating Company, Inc., Bedford, MA (US)

(72) Inventors: Thomas Wagner, Concord, MA (US); Kevin Ahearn, Nebo, NC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey Operating Company, Inc., Bedford, MA (US)

(*) Notice: Subject to any disclaimer, the term of this patent is extended or adjusted under 35 U.S.C. 154(b) by 266 days.

This patent is subject to a terminal disclaimer.

(21) Appl. No.: 16/804,326

(22) Filed: Feb. 28, 2020

(65) Prior Publication Data

US 2020/0215577 A1 Jul. 9, 2020

Related U.S. Application Data

(63) Continuation of application No. 15/367,793, filed on Dec. 20, 2016, now Pat. No. 10,625,305.

(Continued)

(51) Int. Cl.
*B07C 3/02* (2006.01)
*B07C 3/00* (2006.01)
(Continued)

(52) U.S. Cl.
CPC ............ *B07C 3/02* (2013.01); *B07C 3/003* (2013.01); *B07C 3/008* (2013.01); *B07C 3/14* (2013.01);
(Continued)

(58) Field of Classification Search
CPC .......... B07C 3/02; B07C 3/008; B25J 9/0093; B65G 47/90
See application file for complete search history.

(56) References Cited

U.S. PATENT DOCUMENTS 3,734,286 A 5/1973 Simjian
4,186,836 A 2/1980 Wassmer et al.
(Continued)

FOREIGN PATENT DOCUMENTS

AU 2006204622 A1 3/2007
CN 1033604 A 7/1989
(Continued)

OTHER PUBLICATIONS

Communication pursuant to Article 94(3) EPC issued by the European Patent Office in related European Patent Application No. 16816518.1 dated Jul. 30, 2020, 5 pages.
(Continued)

*Primary Examiner* — Thomas Randazzo
(74) *Attorney, Agent, or Firm* — Gesmer Updegrove LLP

(57) ABSTRACT

A method of processing objects is disclosed using a programmable motion device. The method includes the steps of acquiring an object from a plurality of mixed objects at an input area, perceiving identifying indicia in connection with the object, assigning an intermediate station to a destination
(Continued)

location for the object responsive to the identifying indicia in connection with the object, and moving the acquired object toward the intermediate station.

41 Claims, 24 Drawing Sheets

Related U.S. Application Data

(60) Provisional application No. 62/265,181, filed on Dec. 9, 2015, provisional application No. 62/263,050, filed on Dec. 4, 2015.

(51) Int. Cl.

| | |
|---|---|
| *B07C 3/14* | (2006.01) |
| *B25J 9/00* | (2006.01) |
| *B25J 9/16* | (2006.01) |
| *B65G 47/90* | (2006.01) |
| *B65G 47/96* | (2006.01) |
| *B65G 43/08* | (2006.01) |
| *B65G 47/34* | (2006.01) |
| *G05B 19/418* | (2006.01) |
| *G06Q 10/08* | (2012.01) |

(52) U.S. Cl.
CPC .............. *B25J 9/0093* (2013.01); *B25J 9/16* (2013.01); *B25J 9/1694* (2013.01); *B65G 43/08* (2013.01); *B65G 47/34* (2013.01); *B65G 47/90* (2013.01); *B65G 47/905* (2013.01); *B65G 47/962* (2013.01); *G05B 19/4182* (2013.01); *G05B 19/4189* (2013.01); *G06Q 10/087* (2013.01); *B07C 2301/00* (2013.01); *G05B 2219/32328* (2013.01); *G05B 2219/40078* (2013.01); *G05B 2219/45047* (2013.01); *G05B 2219/45056* (2013.01); *Y02P 90/02* (2015.11)

(56) References Cited

U.S. PATENT DOCUMENTS

| | | | | |
|---|---|---|---|---|
| 4,244,459 A * | 1/1981 | Garrett | ............... | B65G 47/1492 198/396 |
| 4,722,653 A * | 2/1988 | Williams | ................ | B23P 21/00 198/346.2 |
| 4,759,439 A | 7/1988 | Hartlepp | | |
| 4,846,335 A | 7/1989 | Hartlepp | | |
| 4,895,242 A | 1/1990 | Michel | | |
| 5,082,103 A | 1/1992 | Ross et al. | | |
| 5,190,162 A | 3/1993 | Hartlepp | | |
| 5,281,081 A | 1/1994 | Kato | | |
| 5,419,457 A | 5/1995 | Ross et al. | | |
| 5,794,788 A | 8/1998 | Massen | | |
| 5,794,789 A | 8/1998 | Payson et al. | | |
| 5,839,566 A | 11/1998 | Bonnet | | |
| 5,875,434 A | 2/1999 | Matsuoka et al. | | |
| 6,011,998 A | 1/2000 | Lichti et al. | | |
| 6,059,092 A | 5/2000 | Jerue et al. | | |
| 6,060,677 A | 5/2000 | Ulrichsen et al. | | |
| 6,076,023 A | 6/2000 | Sato | | |
| 6,079,570 A * | 6/2000 | Oppliger | ................... | B07C 3/02 209/706 |
| 6,131,372 A | 10/2000 | Pruett | | |
| 6,208,908 B1 | 3/2001 | Boyd et al. | | |
| 6,246,023 B1 | 6/2001 | Kugle | | |
| 6,323,452 B1 | 11/2001 | Bonnet | | |
| 6,390,756 B1 | 5/2002 | Isaacs et al. | | |
| 6,401,936 B1 | 6/2002 | Isaacs et al. | | |
| 6,505,093 B1 | 1/2003 | Thatcher et al. | | |
| 6,579,053 B1 | 6/2003 | Grams et al. | | |
| 6,685,031 B2 | 2/2004 | Takizawa | | |
| 6,688,459 B1 | 2/2004 | Bonham et al. | | |
| 6,762,382 B1 * | 7/2004 | Danelski | ............... | B65G 17/002 209/912 |
| 6,897,395 B2 | 5/2005 | Shiibashi et al. | | |
| 7,516,848 B1 | 4/2009 | Shakes et al. | | |
| 7,728,244 B2 | 6/2010 | De Leo et al. | | |
| 8,662,314 B2 | 3/2014 | Jones et al. | | |
| 8,718,814 B1 | 5/2014 | Clark et al. | | |
| 8,776,694 B2 * | 7/2014 | Rosenwinkel | ....... | B65G 17/345 104/88.02 |
| 8,811,722 B2 | 8/2014 | Perez Cortes et al. | | |
| 8,952,284 B1 | 2/2015 | Wong et al. | | |
| 8,972,049 B2 * | 3/2015 | Tidhar | .................... | B65B 57/14 700/240 |
| 9,102,336 B2 * | 8/2015 | Rosenwinkel | .......... | B61B 13/04 |
| 9,120,622 B1 | 9/2015 | Elazary et al. | | |
| 9,227,323 B1 * | 1/2016 | Konolige | ............... | B25J 9/1697 |
| 9,346,083 B2 | 5/2016 | Stone | | |
| 9,364,865 B2 | 6/2016 | Kim | | |
| 9,481,518 B2 | 11/2016 | Neiser | | |
| 9,486,926 B2 | 11/2016 | Kawano | | |
| 9,492,923 B2 | 11/2016 | Wellman et al. | | |
| 9,878,349 B2 | 1/2018 | Crest et al. | | |
| 9,931,673 B2 | 4/2018 | Nice et al. | | |
| 9,937,532 B2 | 4/2018 | Wagner et al. | | |
| 10,625,305 B2 * | 4/2020 | Wagner | .................. | B65G 47/34 |
| 2002/0092801 A1 * | 7/2002 | Dominguez | .......... | B07C 5/3412 209/583 |
| 2002/0157919 A1 | 10/2002 | Sherwin | | |
| 2002/0169698 A1 | 11/2002 | Chien | | |
| 2002/0179502 A1 | 12/2002 | Cerutti et al. | | |
| 2003/0014376 A1 * | 1/2003 | DeWitt | ...................... | B07C 3/00 705/401 |
| 2003/0034281 A1 | 2/2003 | Kumar | | |
| 2003/0038065 A1 * | 2/2003 | Pippin | ..................... | B07C 3/087 198/370.01 |
| 2003/0135300 A1 | 7/2003 | Lewis | | |
| 2004/0065597 A1 | 4/2004 | Hanson | | |
| 2004/0112712 A1 * | 6/2004 | Brooks | ................... | B65G 47/24 198/394 |
| 2004/0261366 A1 | 12/2004 | Gillet et al. | | |
| 2005/0167343 A1 | 8/2005 | Avishay | | |
| 2006/0045672 A1 * | 3/2006 | Maynard | ............... | B65G 1/0435 414/276 |
| 2006/0070929 A1 | 4/2006 | Fry | | |
| 2007/0005179 A1 | 1/2007 | Mccrackin et al. | | |
| 2007/0209976 A1 | 9/2007 | Worth et al. | | |
| 2008/0181753 A1 * | 7/2008 | Bastian | ................ | B65G 1/1376 414/277 |
| 2009/0218262 A1 * | 9/2009 | Bowers | ..................... | B07C 3/00 209/584 |
| 2010/0122942 A1 | 5/2010 | Harres et al. | | |
| 2010/0318216 A1 | 12/2010 | Faivre | | |
| 2011/0144798 A1 | 6/2011 | Freudelsperger | | |
| 2011/0238207 A1 | 9/2011 | Bastian, II et al. | | |
| 2011/0243707 A1 | 10/2011 | Dumas et al. | | |
| 2011/0320036 A1 | 12/2011 | Freudelsperger | | |
| 2012/0118699 A1 | 5/2012 | Buchmann et al. | | |
| 2012/0328397 A1 | 12/2012 | Yamashita | | |
| 2013/0110280 A1 | 5/2013 | Folk | | |
| 2013/0202195 A1 | 8/2013 | Perez Cortes et al. | | |
| 2014/0061103 A1 | 3/2014 | Ito et al. | | |
| 2014/0244026 A1 | 8/2014 | Neiser | | |
| 2014/0291112 A1 | 10/2014 | Lyon et al. | | |
| 2014/0305847 A1 | 10/2014 | Kudrus | | |
| 2014/0360924 A1 | 12/2014 | Smith et al. | | |
| 2015/0057793 A1 * | 2/2015 | Kawano | ................... | B25J 15/06 700/216 |
| 2015/0073589 A1 | 3/2015 | Khodl et al. | | |
| 2015/0081090 A1 * | 3/2015 | Dong | ..................... | B07C 5/3422 700/230 |
| 2015/0283586 A1 | 10/2015 | Dante et al. | | |
| 2015/0306634 A1 | 10/2015 | Maeda et al. | | |
| 2015/0375398 A1 | 12/2015 | Penn et al. | | |
| 2016/0096694 A1 | 4/2016 | Baylor et al. | | |
| 2016/0199884 A1 * | 7/2016 | Lykkegaard | ....... | G05B 19/4182 700/223 |
| 2016/0221762 A1 | 8/2016 | Schroader | | |

(56) References Cited

U.S. PATENT DOCUMENTS

| | | | |
|---|---|---|---|
| 2016/0228921 A1 | 8/2016 | Doublet et al. | |
| 2016/0244262 A1 | 8/2016 | O'Brien et al. | |
| 2016/0347545 A1 | 12/2016 | Lindbo et al. | |
| 2017/0043953 A1* | 2/2017 | Battles | B65G 1/04 |
| 2017/0066597 A1* | 3/2017 | Hiroi | G05B 15/02 |
| 2017/0080566 A1* | 3/2017 | Stubbs | G06Q 10/087 |
| 2017/0106532 A1 | 4/2017 | Wellman et al. | |

FOREIGN PATENT DOCUMENTS

| | | | |
|---|---|---|---|
| CN | 2513958 Y | 10/2002 | |
| CN | 101808916 A | 8/2010 | |
| CN | 102205907 A | 10/2011 | |
| CN | 102390701 A | 3/2012 | |
| CN | 102849423 A | 1/2013 | |
| CN | 103318653 A | 9/2013 | |
| CN | 103387120 A | 11/2013 | |
| CN | 104858150 A | 8/2015 | |
| CN | 204724475 U | 10/2015 | |
| CN | 108602630 A | 9/2018 | |
| DE | 19510392 A1 | 9/1996 | |
| DE | 102004001181 A1 | 8/2005 | |
| DE | 102004013353 A1 | 10/2005 | |
| DE | 102005061309 A1 | 7/2007 | |
| DE | 102007023909 A1 | 11/2008 | |
| DE | 102007038834 A1 | 2/2009 | |
| DE | 102010002317 A1 | 8/2011 | |
| DE | 102012102333 A1 | 9/2013 | |
| DE | 102014111396 A1 | 2/2016 | |
| EP | 0613841 A1 | 9/1994 | |
| EP | 1695927 A2 | 8/2006 | |
| EP | 1995192 A2 * | 11/2008 | B64F 1/368 |
| EP | 1995192 A2 | 11/2008 | |
| EP | 2233400 A1 | 9/2010 | |
| EP | 2511653 A1 | 10/2012 | |
| EP | 2650237 A1 | 10/2013 | |
| EP | 2823899 A1 | 1/2015 | |
| EP | 3006379 A2 | 4/2016 | |
| EP | 3112295 A1 | 1/2017 | |
| FR | 1457450 A | 1/1966 | |
| FR | 2832654 A1 | 5/2003 | |
| GB | 2084531 A | 4/1982 | |
| GB | 2507707 A | 5/2014 | |
| JP | S54131278 A | 10/1979 | |
| JP | S63310406 A | 12/1988 | |
| JP | 2002028577 A | 1/2002 | |
| JP | 2007182286 A | 7/2007 | |
| JP | 2008037567 A | 2/2008 | |
| JP | 2014141313 A | 8/2014 | |
| WO | 2005022076 A2 | 3/2005 | |
| WO | 2007009136 A1 | 1/2007 | |
| WO | 2008091733 A2 | 7/2008 | |
| WO | 2010017872 A1 | 2/2010 | |
| WO | 2010099873 A1 | 9/2010 | |
| WO | 2011038442 A2 | 4/2011 | |
| WO | 2012024714 A2 | 3/2012 | |
| WO | 2016100235 A1 | 6/2016 | |
| WO | 2017150006 A1 | 9/2017 | |

OTHER PUBLICATIONS

Non-Final Office Action issued by the U.S. Patent and Trademark Office in related U.S. Appl. No. 16/902,351 dated Oct. 4, 2021, 18 pages.
European Search Report, along with the transmittal, issued by the European Patent Office, in related European Patent Application No. 20204823.7 dated Feb. 4, 2021, 12 pages.
First Office Action, and its English Translation, issued by the State Intellectual Property Office of the People's Republic of China, in related Chinese Patent Application No. 201680080909.X dated Jun. 11, 2020, 27 pages.

Office Action issued by Innovation, Science and Economic Development Canada in related Canadian Patent Application No. 3,007,358 dated Oct. 2, 2020, 5 pages.
Non-Final Office Action issued by the U.S. Patent and Trademark Office in related U.S. Appl. No. 15/367,793 dated Feb. 28, 2018, 24 pages.
Final Office Action issued by the U.S. Patent and Trademark Office in related U.S. Appl. No. 15/367,793 dated Dec. 7, 2018, 27 pages.
International Search Report and Written Opinion issued by the International Searching Authority, the European Patent Office, dated Apr. 5, 2017 in related International Application No. PCT/US22016/064587, 16 pages.
International Preliminary Report on Patentability issued by the International Bureau of WIPO dated Jun. 5, 2018, in related International Application No. PCT/US2016/064587, 13 pages.
International Search Report and Written Opinion issued by the International Searching Authority, the European Patent Office, dated Mar. 16, 2017 in related International Application No. PCT/US2016/064389, 11 pages.
International Preliminary Report on Patentability issued by the International Bureau of WIPO dated Jun. 5, 2018, in related International Application No. PCT/US2016/064389, 6 pages.
Non-Final Office Action issued by the U.S. Patent and Trademark Office in related U.S. Appl. No. 15/367,793 dated May 28, 2019, 32 pages.
Office Action issued by Innovation, Science and Economic Development Canada in related Canadian Patent Application No. 3,007,358 dated May 15, 2019, 5 pages.
Office Action issued by Innovation, Science and Economic Development Canada in related Canadian Patent Application No. 3,007,359 dated Apr. 17, 2019, 4 pages.
Office Action, and its English Translation, issued by the State Intellectual Property Office of the People's Republic of China, in related Chinese Patent Application No. 20160080930.X dated Jul. 10, 2019, 23 pages.
Rules 161(1) and 162 EPC issued by the European Patent Office dated Jul. 11, 2018 in related European Patent Application No. 16822292.5, 3 pages.
Rules 161(1) and 162 EPC issued by the European Patent Office dated Aug. 10, 2018 in related European Patent Application No. 16816518.1, 3 pages.
Non-Final Office Action issued by the U.S. Patent and Trademark Office in related U.S. Appl. No. 15/241,779 dated Dec. 12, 2017, 8 pages.
Final Office Action issued by the U.S. Patent and Trademark Office in related U.S. Appl. No. 15/241,779 dated Sep. 27, 2018, 10 pages.
Non-Final Office Action issued by the U.S. Patent and Trademark Office in related U.S. Appl. No. 15/241,779 dated Mar. 29, 2019, 9 pages.
Office Action issued by Innovation, Science and Economic Development Canada in related Canadian Patent Application No. 3,007,358 dated Jan. 17, 2020, 3 pages.
Office Action, Article 94(3) EPC, issued by the European Patent Office dated Oct. 24, 2019 in related European Patent Application No. 16816518.1, 5 pages.
Office Action issued by Innovation, Science and Economic Development Canada in related Canadian Patent Application No. 3,007,359 dated Mar. 10, 2020, 3 pages.
U.S. Appl. No. 62/269,640 filed with the U.S. Patent and Trademark Office dated Dec. 18, 2015, 36 pages.
Final Office Action issued by the U.S. Patent and Trademark Office in related U.S. Appl. No. 15/241,779 dated Dec. 27, 2019, 11 pages.
Notice on the Third Office Action and the Third Office Action, along with its English translation, issued by the China National Intellectual Property Administration in related Chinese Patent Application No. 201680080930.X dated Jan. 6, 2021, 10 pages.
Office Action issued by Innovation, Science and Economic Development Canada in related Canadian Patent Application No. 3,007,359 dated Dec. 24, 2020, 3 pages.
Second Office Action, and its English Translation, issued by the State Intellectual Property Office of the People's Republic of China, in related Chinese Patent Application No. 20160080930.X dated May 13, 2020, 13 pages.

(56) References Cited

OTHER PUBLICATIONS

Communication pursuant to Article 94(3) EPC issued by the European Patent Office in related European Patent Application No. 16816518.1 dated Aug. 11, 2021, 4 pages.
Decision on Rejection, and its English Translation, issued by the China National Intellectual Property Administration in related Chinese Patent Application No. 201680080909.X dated Jun. 2, 2021, 22 pages.
Second Office Action, and its English Translation, issued by the China National Intellectual Property Administration in related Chinese Patent Application No. 201680080909.X dated Jan. 8, 2021, 28 pages.
Examiner's Report issued by Innovation, Science and Economic Development Canada (Canadian Intellectual Property Office) in related Canadian Patent Application No. 3,007,359 dated Nov. 4, 2021, 3 pages.
Notice on the Fourth Office Action, and its English Translation, issued by the China National Intellectual Property Administration in related Chinese Patent Application No. 201680080930.X dated May 8, 2021, 10 pages.

* cited by examiner

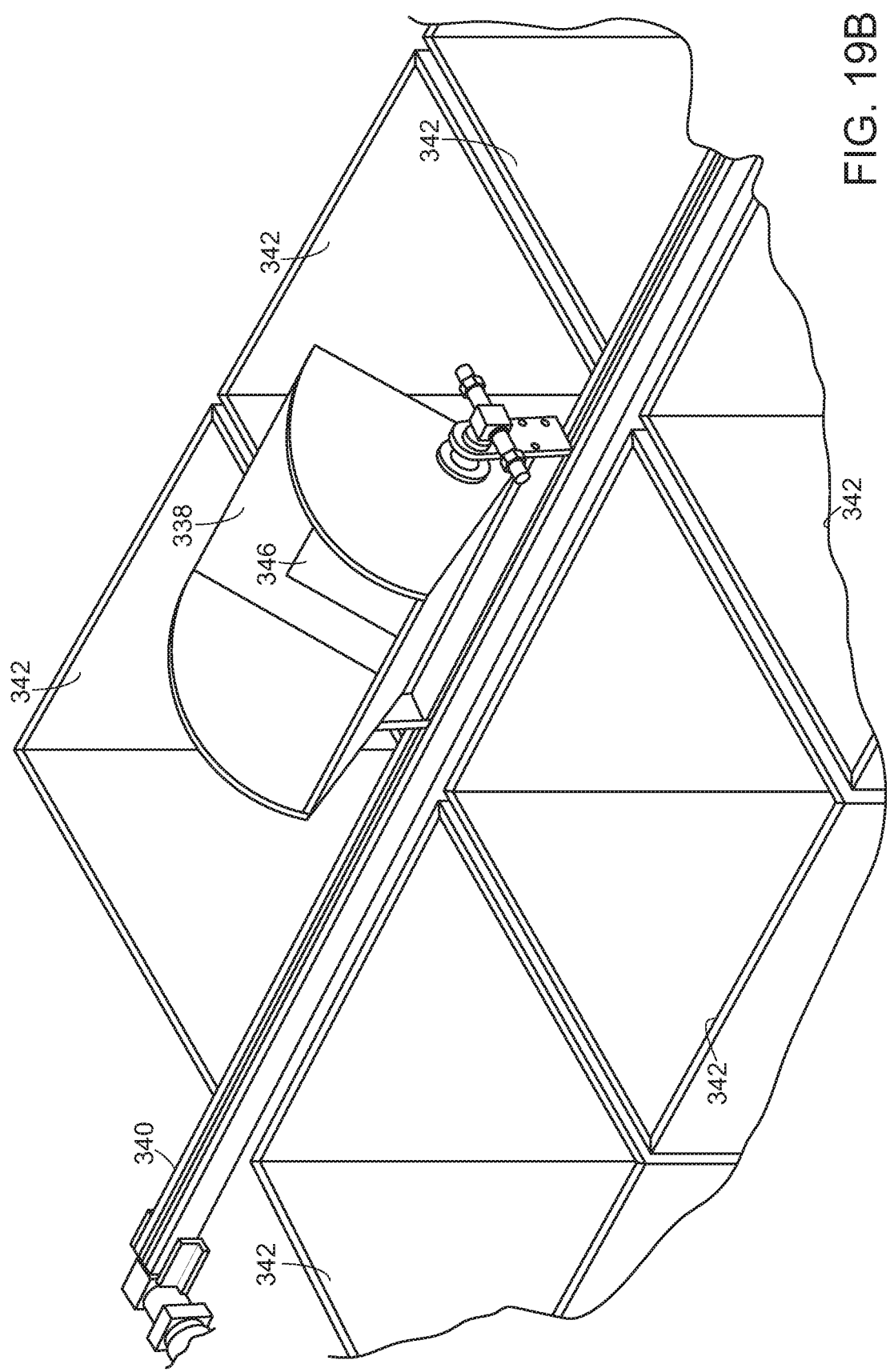

SYSTEMS AND METHODS FOR DYNAMIC PROCESSING OF OBJECTS

PRIORITY

The present application is a continuation of U.S. patent application Ser. No. 15/367,793, filed Dec. 2, 2016, which claims priority to U.S. Provisional Patent Application Ser. No. 62/263,050, filed Dec. 4, 2015, as well as U.S. Provisional Patent Application Ser. No. 62/265,181 filed Dec. 9, 2015, the disclosures of which are hereby incorporated by reference in their entireties.

BACKGROUND

The invention generally relates to automated sortation and other processing systems, and relates in certain embodiments to robotic systems for sorting objects (e.g., parcels, packages, articles etc.).

Current distribution center sorting systems, for example, generally assume an inflexible sequence of operations whereby a disorganized stream of input objects is first singulated by human workers into a single stream of isolated objects presented one at a time to a human worker with a scanner that identifies the object. The objects are then loaded onto a conveyor, and the conveyor then transports the objects to the desired destination, which may be a bin, a chute, a bag or a destination conveyor.

In typical parcel sortation systems, human workers typically retrieve parcels in an arrival order, and sort each parcel or object into a collection bin based on a given heuristic. For instance, all objects of like type might go to a collection bin, or all objects in a single customer order, or all objects destined for the same shipping destination, etc. The human workers are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects in unison is not always most efficient.

Current state of the art sortation systems rely on human labor. Most solutions rely on a worker that is performing sortation, by scanning an object from an induction area (chute, table, etc.) and placing the object in a staging location, or collection bin. When a bin is full or the controlling software system decides that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Partially automated means of solving this problem are lacking in key areas. Such approaches typically involve tilt-tray or bomb-bay style recirculating conveyors. These conveyors have discrete trays that can be loaded with an object. The trays and objects then pass through scan tunnels that scan the object and associate it with the tray in which it is riding; when the tray passes the correct bin, a trigger mechanism causes the tray to dump the object into the bin. A drawback of such systems is that every divert requires an actuator, which increases the mechanical complexity and the cost per divert can be very high. For applications requiring hundreds of diverts, the large cost of such a system does not achieve a good return on investment.

An alternative is to use human labor to increase the number of diverts, or collection bins, available in the system. This decreases system installation costs, but increases the operating costs. Manual sortation cells are staffed by a team of workers, which avoids the large cost per divert. Multiple cells can then work in parallel, effectively multiplying throughput linearly while keeping the number of expensive automated diverts at a minimum (equal to the number of parallel sortation cells, not the total number of system bins needed). This approach involves objects for sortation being supplied to each cell, which can be done manually but is easily done via means of a conveyor with sweep arms or other dumb diverts to each work cell. Such diverts do not identify an object and cannot divert it to a particular spot; rather they work with beam breaks or other simple sensors to seek to make sure that indiscriminate bunches of objects get diverted to each cell. The lower cost of the unsophisticated diverts coupled with the low number of diverts keeps the overall system divert cost low.

Unfortunately however, these systems don't address the limitations to total number of system bins. The system is simply diverting an equal share of the total objects to each parallel manual cell. Each parallel sortation cell must therefore have all the same collection bins designations; otherwise an object might be delivered to a cell that does not have a bin to which that object is mapped. There remains a need for a more efficient and more cost effective object sortation system that sorts objects into appropriate collection bins, yet is more efficient in operation.

SUMMARY

In accordance with an embodiment, the invention provides a method of processing objects using a programmable motion device. The method includes the steps of acquiring an object from a plurality of mixed objects at an input area, perceiving identifying indicia in connection with the object, assigning an intermediate station to a destination location for the object responsive to the identifying indicia in connection with the object, and moving the acquired object toward the intermediate station.

In accordance with another embodiment, the invention provides an object processing system that includes at least one programmable motion device for acquiring an object to be processed from an input station, and a processor for dynamically assigning an intermediate location for the object, the intermediate location being dynamically associated with a destination location.

In accordance with a further embodiment, the invention provides a method of processing objects that includes the steps of acquiring an object to be sorted from an input station, identifying the object to determine indicia associated with the object, assigning an intermediate station to the object responsive to the indicia, and moving the object using a first automated carriage toward the intermediate station, wherein the intermediate station is associated with a destination location.

BRIEF DESCRIPTION OF THE DRAWINGS

The following description may be further understood with reference to the accompanying drawings in which:

FIGS. 19A-19C show illustrative diagrammatic views of carriage movement in a shuttle wing sortation station of FIG. 16 without the guide walls for clarity;

The drawings are shown for illustrative purposes only.

DETAILED DESCRIPTION

In accordance with various embodiments, the invention provides an inherently more flexible object sortation system in which objects may be selected in a most advantageous order, and the sortation of those objects may take advantage of dynamically varying correspondence between the sorter outputs and the ultimate object destinations.

Applicants have discovered that when automating sortation of objects, there are certain objectives to consider: 1) the overall system throughput (parcels sorted per hour), 2) the number of diverts (i.e., number of discrete locations to which an object may be routed), 3) the total area of sortation system (square feet), and 4) the annual costs to run the system (man-hours, electrical costs, cost of disposable components).

Systems and methods of the present invention are well suited to applications in current sortation systems that receive objects in a disorganized stream and are required to sort the objects into sorted streams. Such systems recognize that reading information on an object may sometimes be challenging; once an object is scanned therefore, it is important to keep the information associated with the object. The acquisition of objects from disorganized jumbles is also challenging, and once an object is acquired, it is important to keep the object separated from other objects. Further, conventional transport and conveying systems have limited flexibility, typically following a single track that passes every possible destination.

In accordance with certain embodiments, the invention provides systems and methods that upend basic assumptions of current sortation systems, with improvements in each of the challenges identified above. The systems, in some embodiments, provide improved scanning and perception systems, and reduce the challenge of scanning an object, and further, by perceiving the entire object's shape and disposition, reduces or eliminates the need to keep the object separate from others. The systems, in certain embodiments, provide improved end effectors, and the use of robotic manipulators to improve the reliability and economy of acquiring objects, even when in a jumble with other objects, reducing the need to maintain separation of objects. The systems, in further embodiments, provide improved transport and conveyor systems, and provide programmable robotic manipulators in particular, that allow dynamically changing patterns of object handling, with resulting efficiencies in the sortation process, lower space requirements, lower demand for manual operations, and as a consequence, lower capital and operating costs for the entire system.

Figure 1:
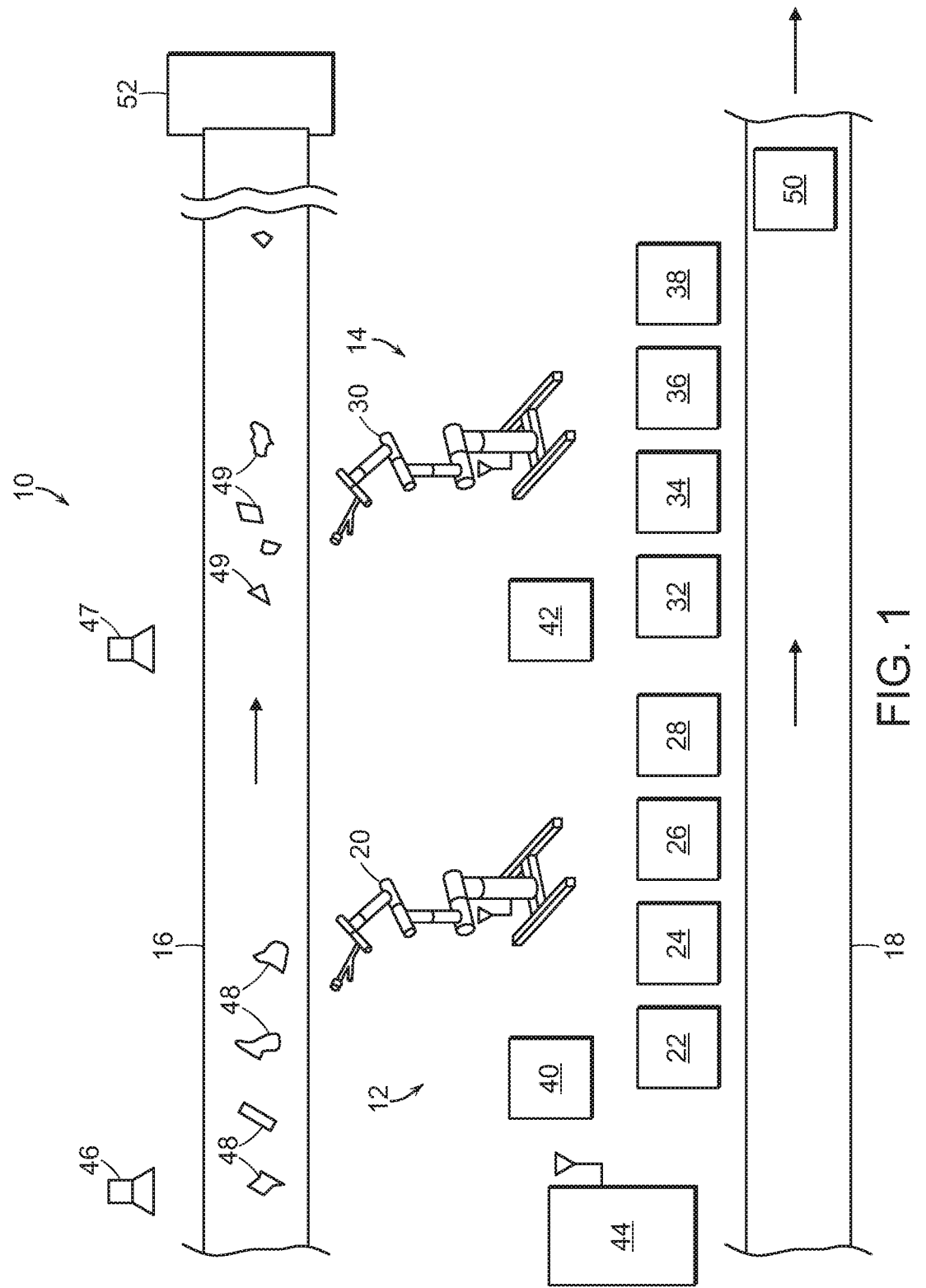
FIG. 1 shows an illustrative diagrammatic view of a system in accordance with an embodiment of the present invention including input and output conveyors.

FIG. 1, for example, shows a system 10 in accordance with an embodiment of the present invention that includes a first sorting station 12 and a second sorting station 14 that are each fed by a common input conveyor 16. An output conveyor 18 carries output bins 50 to downstream processing stations. The first sorting station 12 includes programmable motion device, e.g., a robotic system, 20 as well as collection bins 22, 24, 26 and 28. The second sorting station 14 includes a programmable motion device, e.g., robotic system, 30 as well as collection bins 32, 34, 36 and 38. The first sorting station 12 may also include a stack of additional collection bins 40 and the second sorting station may include a stack of additional collection bins 42. A central controller 44 communicates with the robotic systems 20 and 30 to provide input regarding the assignment of objects to a bin as discussed in more detail below. Perception units 46 and 47 (e.g., cameras or scanners) may be employed to provide the sorting stations 12, 14 with identification information (idicia data) regarding objects 48, 49 that are being provided on the input conveyor 16.

Figure 3:
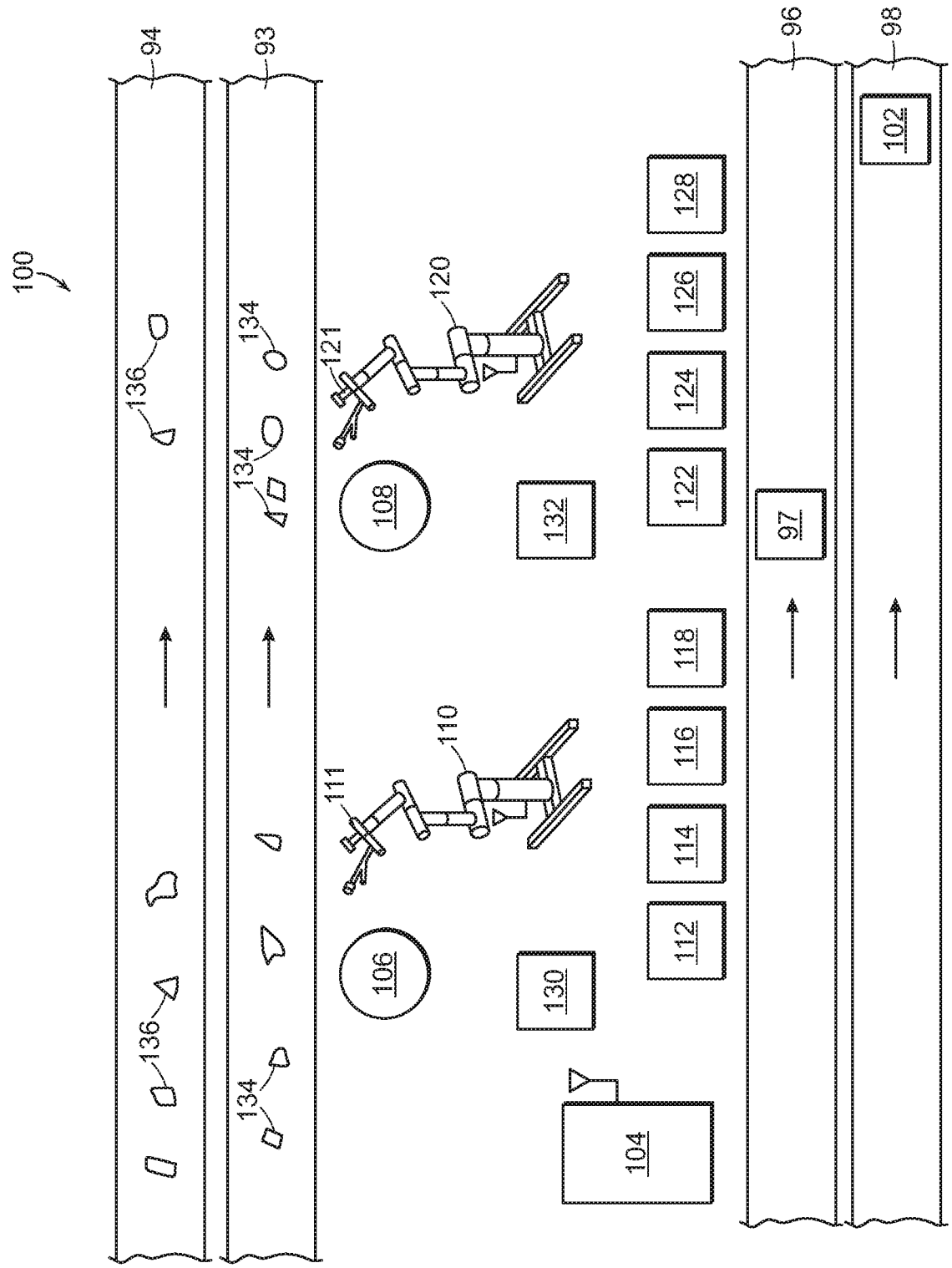
FIG. 3 shows an illustrative diagrammatic view of a system in accordance with a further embodiment of the present invention including multiple input conveyors and multiple output conveyors.

During use, each sorting station 12, 14 may either select an object and then identify the selected object by a detection device on the articulated arm (e.g., in a system as shown in FIG. 3 discussed below), or may first identify an object prior to selection (e.g., using scanners 46, 47), and then grasp the identified object. For each object grasped, the system will place the object in an assigned destination station if a destination station has been assigned to the object. For each new object grasped, the system assigns a new bin to the object if a new bin is available. Otherwise the object is returned to the input conveyor 16. What is significant, is that the sorting station is not pre-assigned a large set of collection bins assigned to all possible objects that may appear in the input path.

Further, the central controller may employ a wide variety of heuristics that may further shape the process of dynamically assigning objects to collection bins as discussed in more detail below. Once bins are either filled or otherwise completed, the completed bins (e.g., 50) are placed onto the destination conveyor 18 as shown, where they are then routed to one or more next processing stations. The system 10 may include any number of sorting stations, and the central controller 44 may manage the assignment of destination stations (e.g., bins) to provide an efficient assignment of objects to destination stations. If any objects cannot be sorted by the time that they reach an end of the input conveyor 16, the objects may fall into a non-identified object bin 52 so that they may either be scanned and placed by a human worker, or replaced back into the input path in the event that a destination station simply was not assigned for the object.

Figure 2:
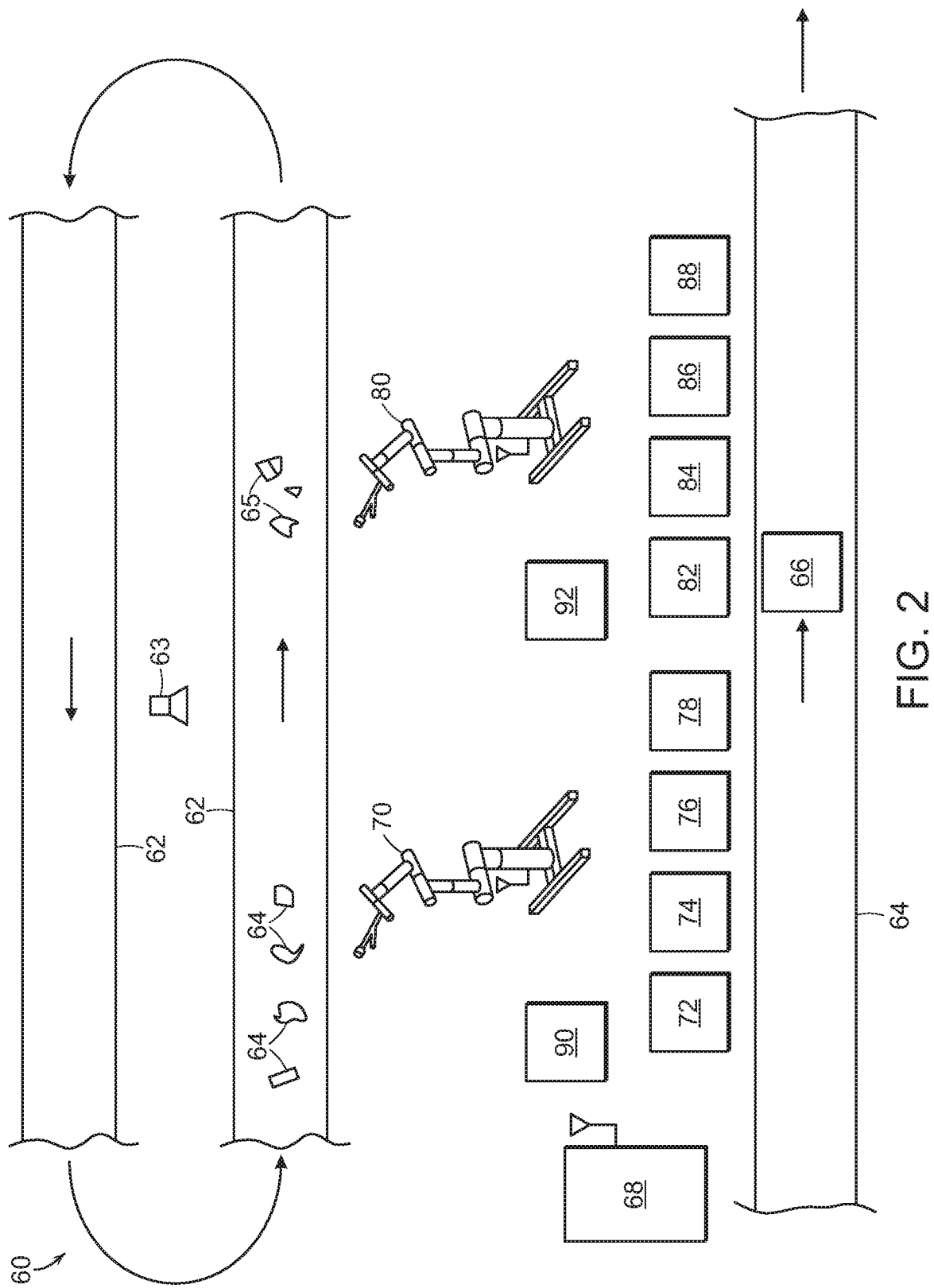
FIG. 2 shows an illustrative diagrammatic view of a system in accordance with another embodiment of the present invention including a circulating input conveyor.

In accordance with another embodiment, and with reference to FIG. 2, a system 60 of the invention may include an input loop conveyor 62 on which objects 64 are provided that pass by multiple sorting stations, as well as an output conveyor 64 on which full or otherwise completed bins 66 may be placed by any of a robotic system or other programmable motion system at a sorting station. Similar to the system 10 of FIG. 1, the system 60 may also include a central controller 68 that communicates with robotic systems 70 and 80, as well as perception units (e.g., 63) to provide input regarding the assignment of objects to a bin as discussed in more detail below. The robotic system 70 provides objects to bins 72, 74, 76 and 78, and the robotic system 80 provides objects to bin 82, 84, 86 and 88. The robotic system 70 may select new bins from the stack of bins 90 and the robotic system 80 may select new bins from the stack of bins 92. Again, the assignment of bins to objects is driven by the objects selected by the robotic systems (as may be directed by or based on input from the control system 68).

The invention provides, therefore, examples of sortation and other distribution systems that involve moving infeed objects directly to a buffer, without human intervention. The buffer holds the objects, possibly in a disorganized jumble, where they may be accessed by one of several sorters. One example would involve a circulating conveyor (as shown in FIG. 2), with integrated perception. The perception system may read labels when they are visible, but may also use more general machine vision algorithms to identify object class and shape, and to track objects as they are circulated. The sorters acquire objects from the buffer. If needed, they use their own perception systems to read labels not previously read. They may move objects to any of several outputs, including the possibility of placing an object back on the buffer, either for later handling or for handling by a different sorter.

Figure 4:
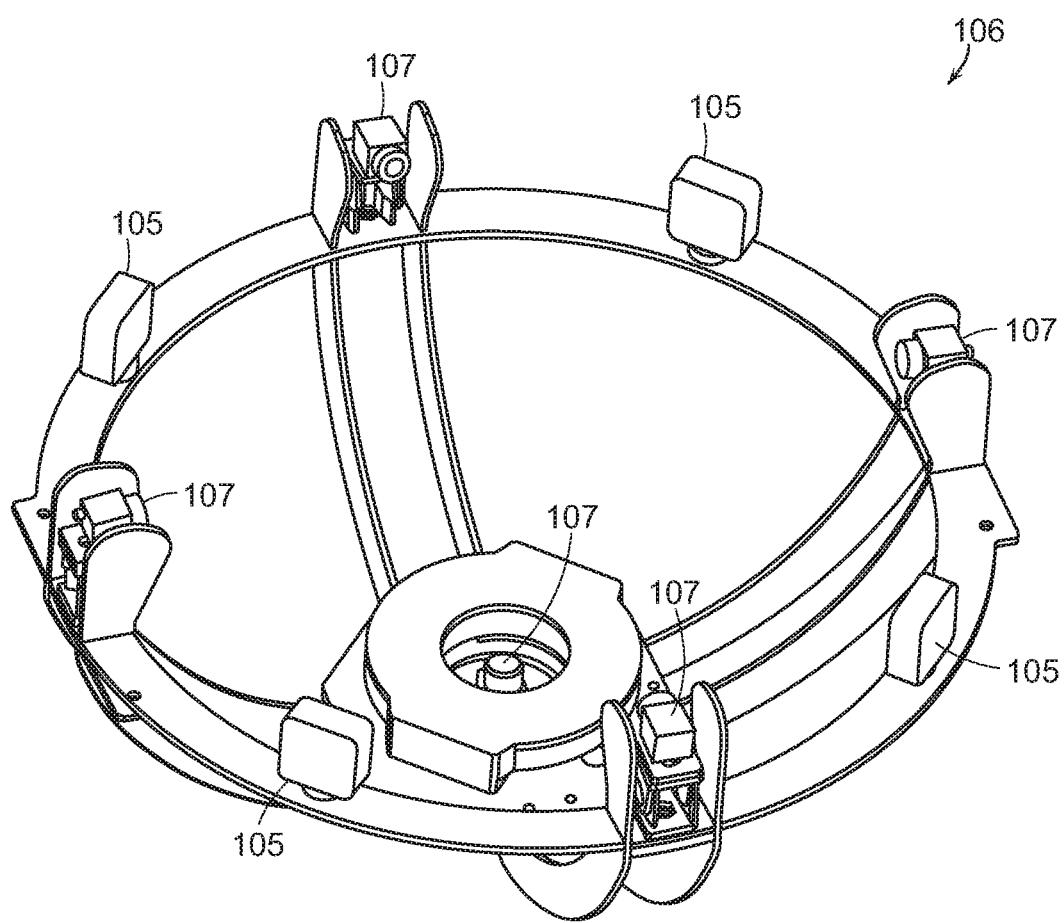
FIG. 4 shows an illustrative diagrammatic view of a perception system for use in connection with the system of FIG. 3.

In accordance with a further embodiment shown in FIG. 3, a system 100 of the invention may include a plurality of input conveyors 93, 94 on which input objects 134, 136 to be sorted are provided. The sorted objects may be provided (e.g., in completed bins 97, 102) on one of a plurality of output conveyors 96, 98. As discussed above, the system may also include a central controller 104 that communicates with perception units 106 and 108, as well as with robotic systems 110 and 120 to provide input regarding the assignment of objects to a bin as discussed in more detail below. With further reference to FIG. 4, each perception unit may include lights 105 and cameras 107, and the robotic system (e.g., 110, 120) may be used to hold one object at time in the associated perception unit (106, 108) so that the system may identify the held object. Similar to the system discussed above, the robotic system 110 provides objects to bins 112, 114, 116 and 118, and the robotic system 120 provides objects to bin 122, 124, 126 and 128. The robotic system 110 may select new bins from the stack of bins 130 and the robotic system 120 may select new bins from the stack of bins 132. Again, the assignment of objects to collection bins is driven by the objects selected by the robotic systems (as may be directed by or based on input from the control system 104). In accordance with further embodiments, the input buffer may also include designated input areas at the sorting stations into which human workers may also provide objects to be sorted. The robotic systems 110 and 120 of FIG. 3 may include perception units over the conveyors as discussed above, and/or perception units 111 and 121 mounted on the robotics that facilitate the selection and grasping of objects from the input conveyors 93 and 94.

A switch may also be used in certain embodiments that correlates sorter outputs with collection bins in a dynamic manner. For example, a system may involve the collection of objects to be bagged by a human worker who then puts them on a conveyor toward a truck-loading area, but with a dynamically generated label indicating the desired destination.

Figure 5:
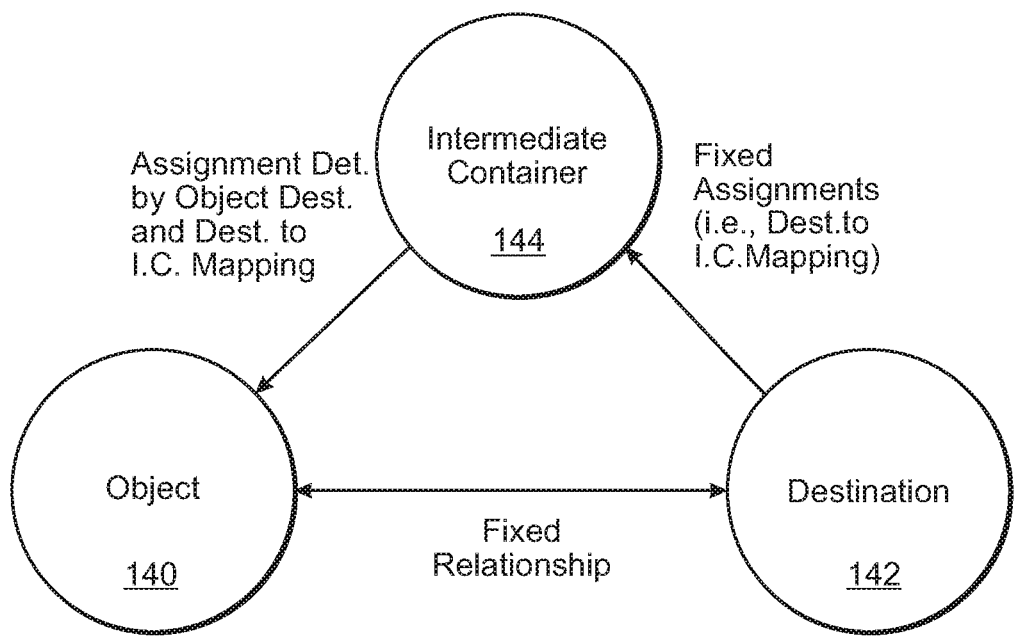
FIG. 5 shows an illustrative diagrammatic view of an object assignment relationship in a conventional sortation system.
Figure 7:
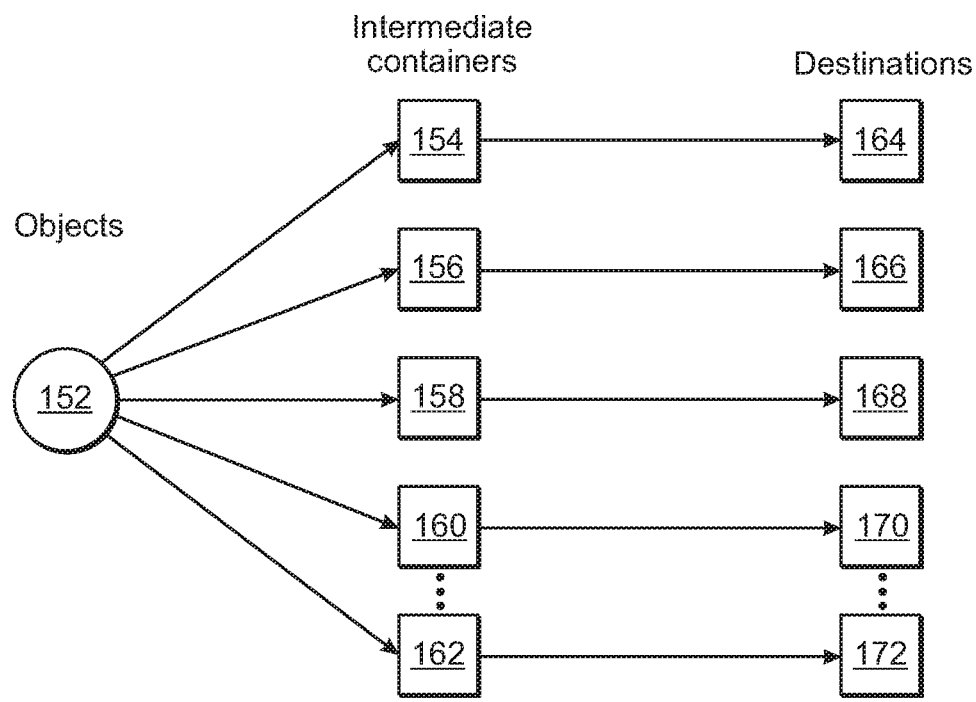
FIG. 7 shows an illustrative diagrammatic view of an object assignment system of FIG. 5.

In a sortation system, the relationship between objects and their intended destinations are known, and may be provided, in a manifest. For example, an object bearing a label addressed to Boston, Mass., will be associated with the destination of Boston, Mass. With reference to FIG. 5, this fixed relationship between an object 140 and a destination 142 is a fixed relationship. In conventional sortation systems, an intermediate container 144 is assigned a fixed relationship with the destination, and this relationship dictates the assignment of the object 140 to the intermediate container 144. This is shown in FIG. 7, where each destination 164, 166, 1687, 170, 172 is associated with an intermediate container 154, 156, 158, 160, 162. As objects 152 are processed, they are simply routed to the appropriate intermediate containers as directed by the fixed relationship.

Figure 6:
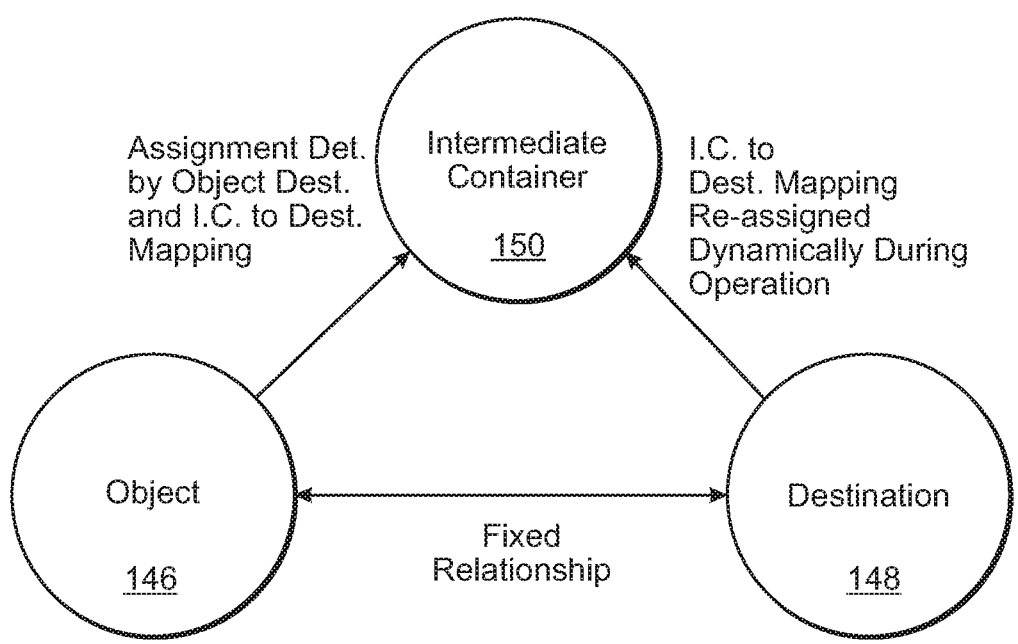
FIG. 6 shows an illustrative diagrammatic view of an object assignment relationship in accordance with certain embodiments of the present invention.

In accordance with embodiments of the present invention on the other hand, the relationships between intermediate containers and destinations is not fixed, and changes dynamically during sortation. FIG. 6, for example, shows that while the relationship between an object 146 and its destination 148 is fixed, the assignment of an intermediate container 150 (e.g., a collection bin), is dynamically chosen based on a variety of heuristics. Once assigned, it remains in place until the collection bin is emptied. As shown in FIG. 6, the assignment of a collection bin (intermediate container 150) for an object 146 is determined by the object destination and the intermediate container to destination mapping, and the destination mapping (between the intermediate container 150 and the destination 148) is re-assigned dynamically during operation.

Figure 8A:
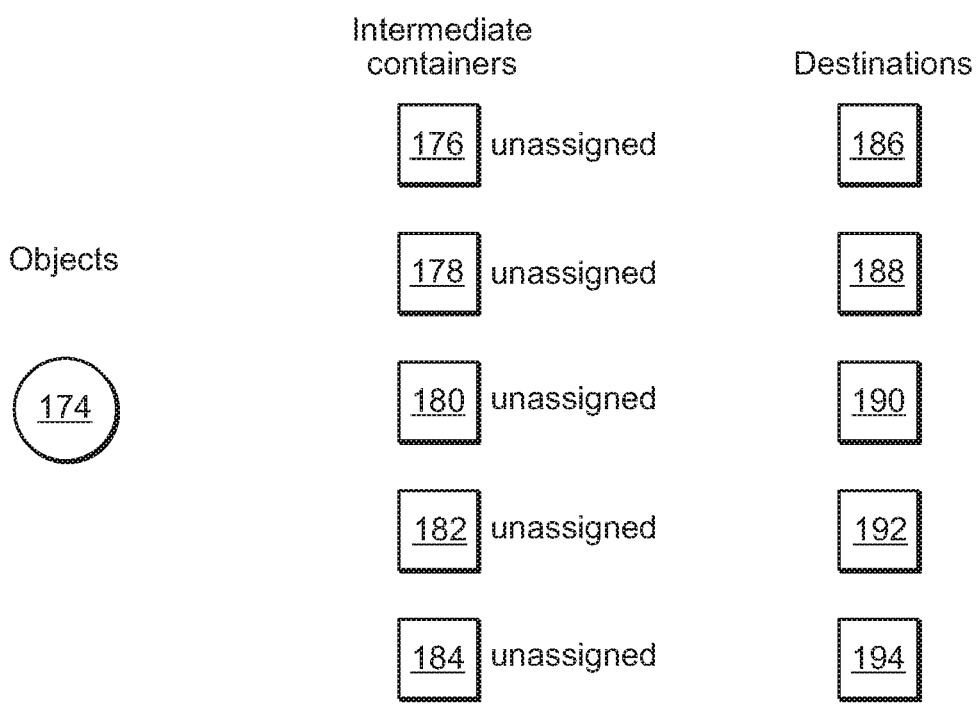
FIGS. 8A-8I show illustrative diagrammatic views of object assignment steps in system in accordance with certain embodiments of the present invention.
Figure 8B:
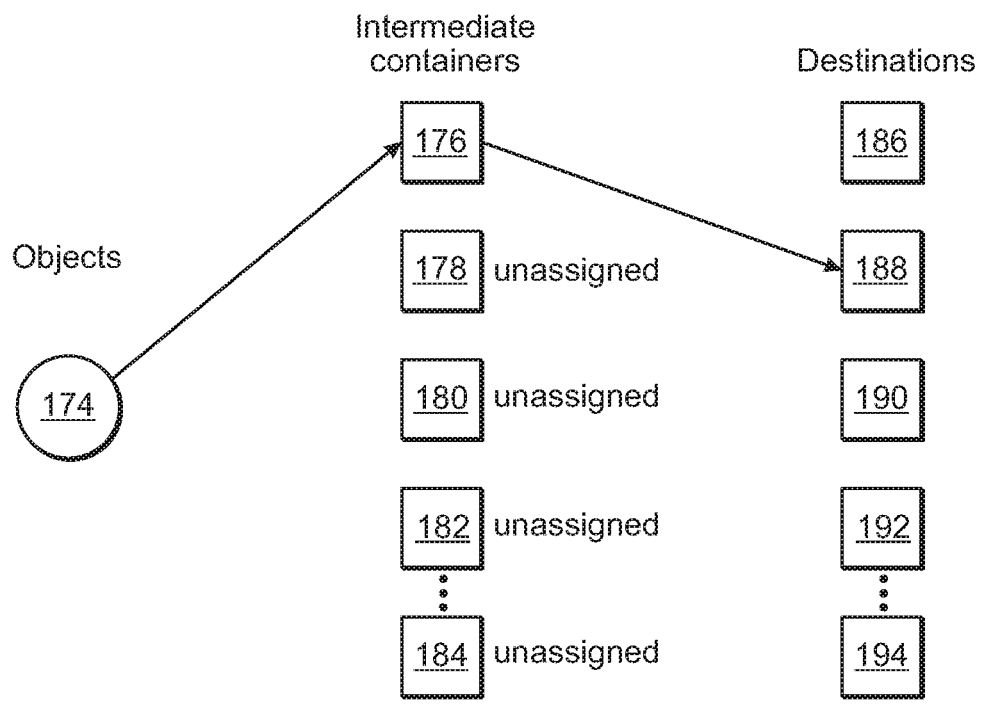
Figure 8C:
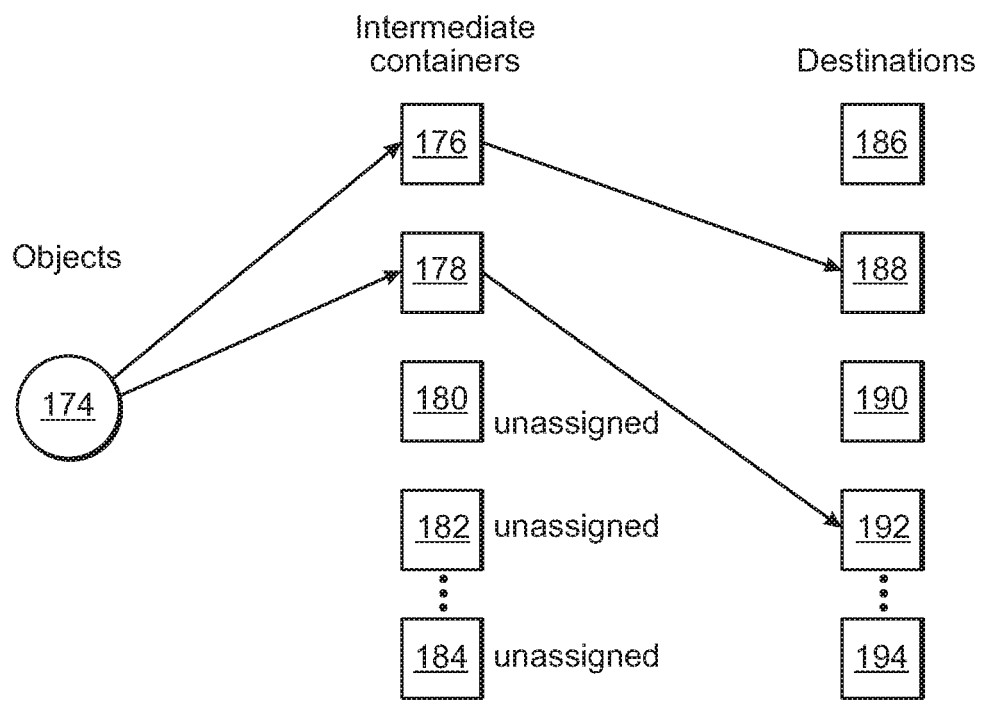
Figure 8D:
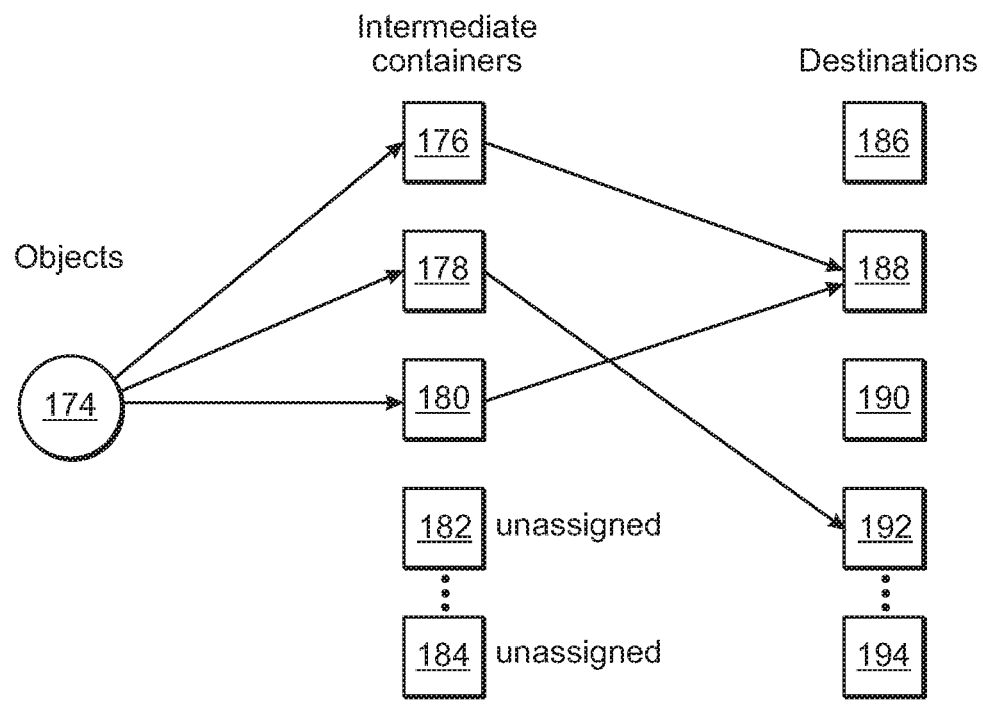
Figure 8E:
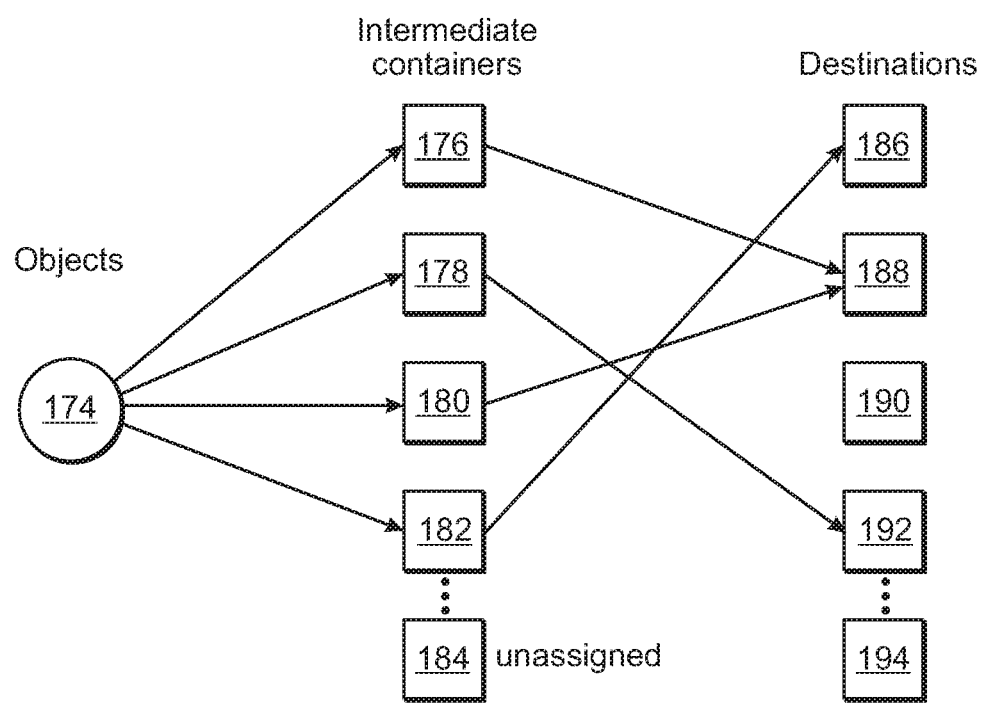
Figure 8F:
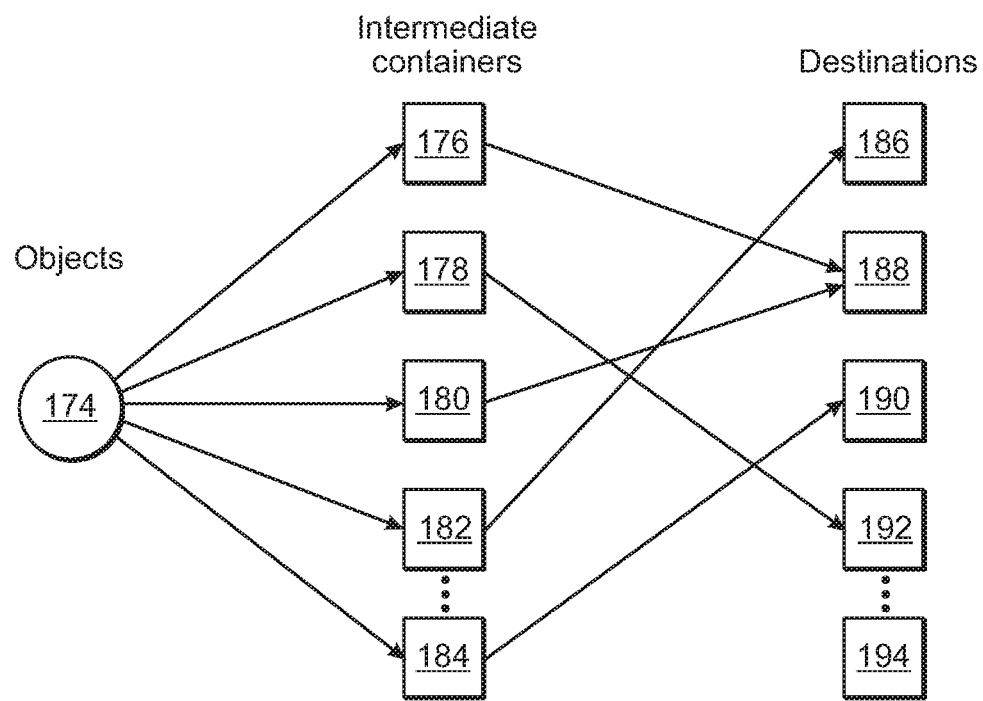
Figure 8G:
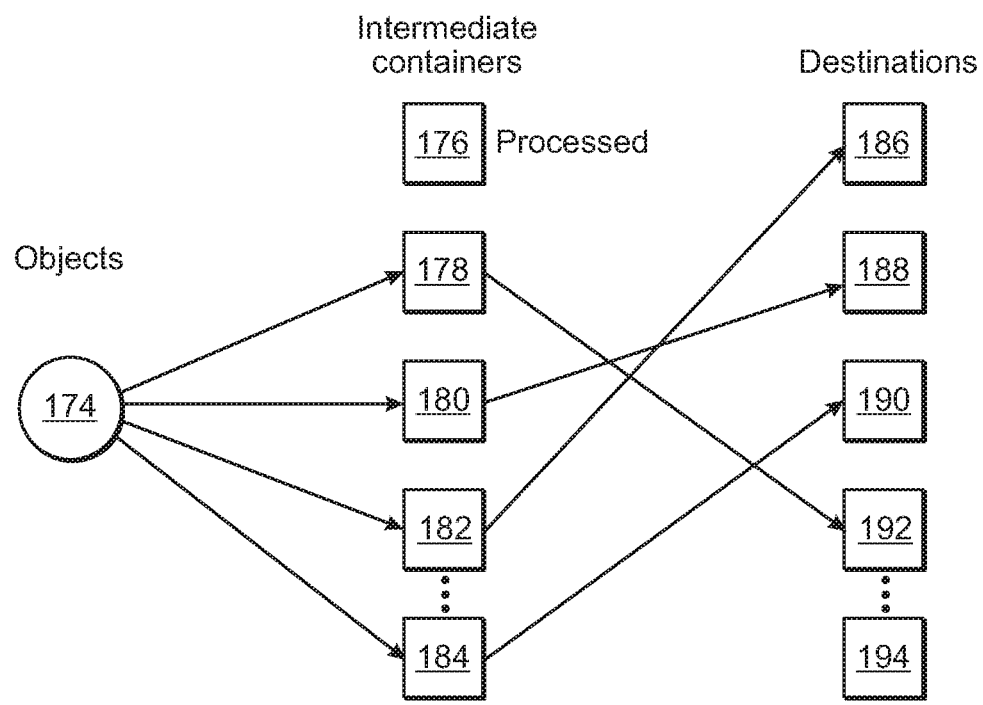

With reference to FIG. 8A, at the beginning of a sortation process, there may be no assigned relationships between intermediate containers 176, 178, 180, 182, 184 and objects 174, or between intermediate containers 176, 178, 180, 182, 184 and destinations 186, 188, 190, 192, 194. As shown in FIG. 8B, when an object's indicia is detected, an intermediate container 176 is assigned to the object, and the object's destination 188 is assigned to the intermediate container as well. Additional objects that are processed and are also associated with the destination 188 are also provided in intermediate container 176. With reference to FIG. 8C, when a different object's indicia is detected that is associated with a different destination 192, a new intermediate container 178 is assigned to the object, and the object's destination 192 is assigned to the intermediate container as well. As noted above, when an object is selected that is associated with a destination, e.g., 188, that already has an intermediate container 176 associated with it, the object may be placed in the same intermediate container 176. In accordance with certain embodiments of the invention however, and with reference to FIG. 8E, the system may elect to assign a new intermediate container 180 to the destination 188, for example, if it is known that many of the objects are likely to be associated with the destination 188. With reference to FIG. 8F, when another object's indicia is detected that is associated with another destination 186, an new intermediate container 184 is assigned to the object, and the object's destination 186 is assigned to the intermediate container 184.

Figure 8H:
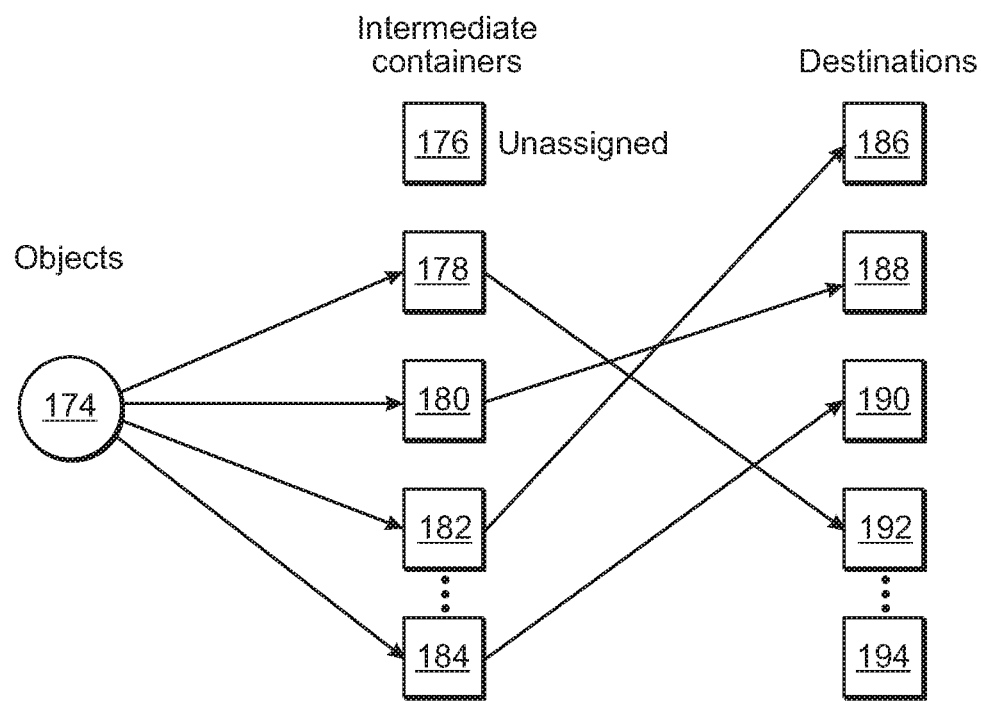
Figure 8I:
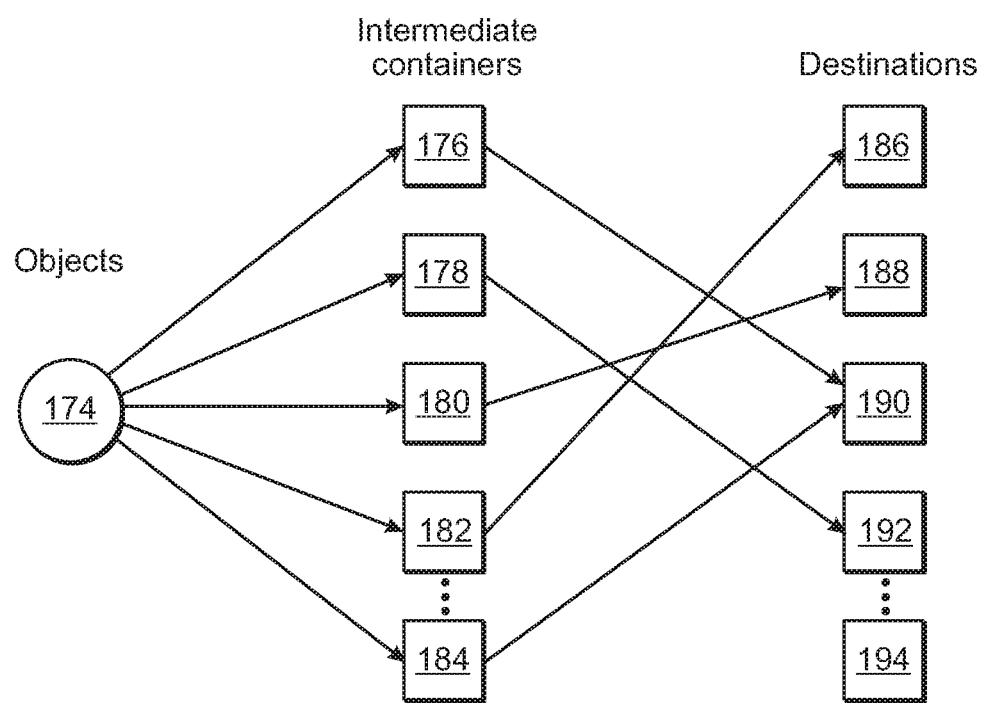

When an intermediate container becomes full or is determined to be otherwise ready for further processing (e.g., if the system determines that it is unlikely to see another object associated with the destination), the intermediate container is emptied and the contents are forwarded for further processing. For example, and with reference to FIG. 8F, when the system determines that intermediate container 176 is full, the contents are emptied, and the intermediate container 176 is then again unassigned to a destination as shown in FIG. 8H. The intermediate container 176 may then later be reused and associated with a new destination 190 as shown in FIG. 8I.

Figure 9:
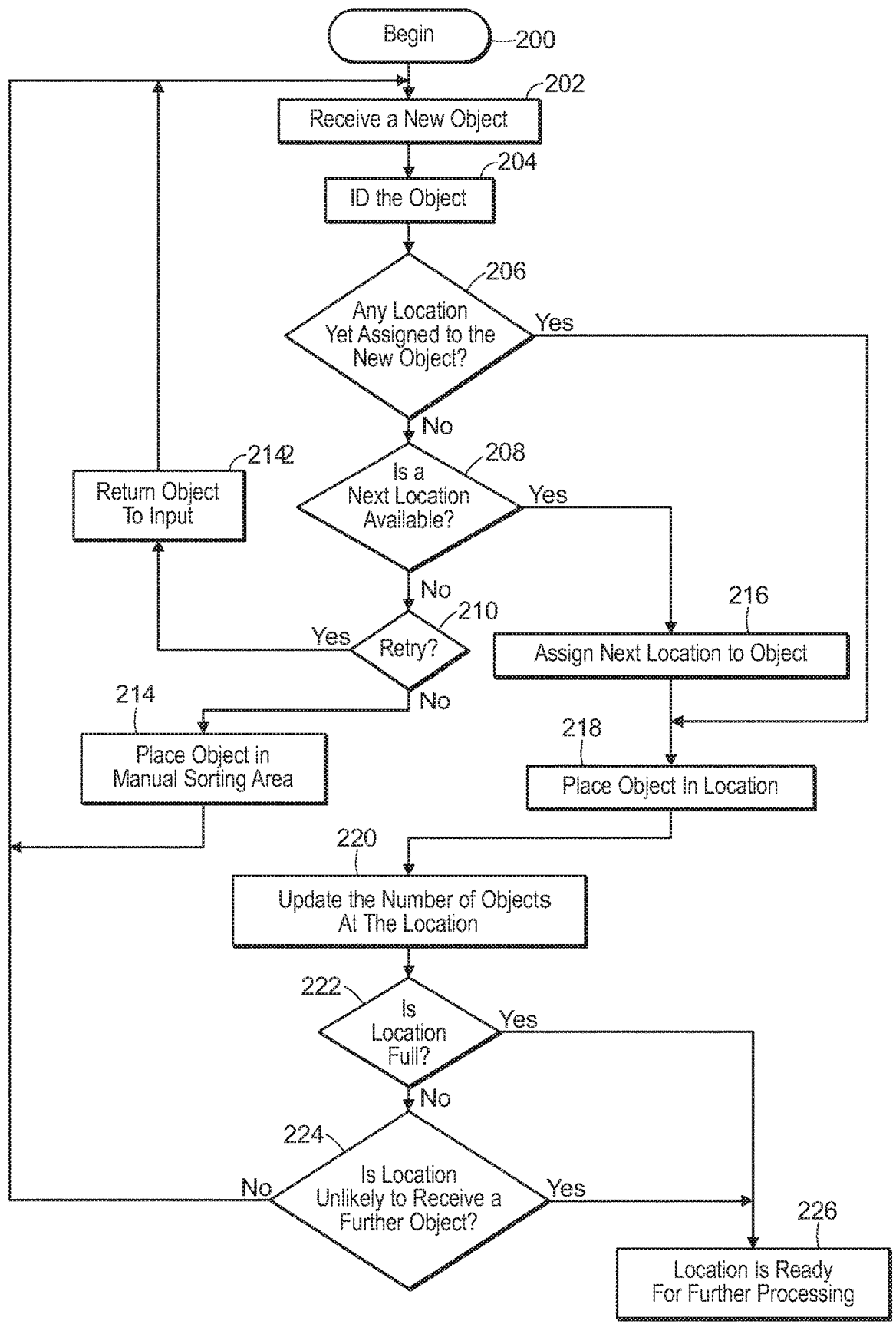
FIG. 9 shows an illustrative flowchart of a process in accordance with an embodiment of the present invention.

As shown in FIG. 9, a sortation process of the invention at a sorting station may begin (step 200) and the articulated arm, or another object reception device, receives a new object (step 202). The system identifies the new object (step 204) by any of an overhead scanner, or a scanner system, or by a drop scanner as discussed herein, etc. The system then determines whether any location at the station has yet been assigned to the new object (step 206). If so, the system then places the object at that location (step 218). If not, the system then determines whether a next location is available (Step 208). If not, the system may (either with or without input from a human) determine whether to retry identifying the object (step 210). If so, then the system would return the object to the input stream (step 212) to be again received at a later time (step 202). If not, the system would place the object in a manual sorting area for sortation by a human (step 214). If a next location is available (step 208), the system then assigns a next location to the object (step 216), and the object is then placed in that location (step 218). If a location had already been assigned to the object (step 206), the system the object is placed in that location (step 218). The number of objects at the location is then updated (step 220), and if the location is then full (step 222), the system identifies that the location is ready for further processing (step 226). If not, the system then determines whether (based on prior knowledge and/or heuristics), whether the location is likely to receive a further object (step 224). If so, the system identifies that the location is ready for further processing (step 226). If not, the system returns to receiving a new object (step 202). The further processing may, for example include collecting the items at the location in a single bag for transport to a shipping location.

Figure 10:
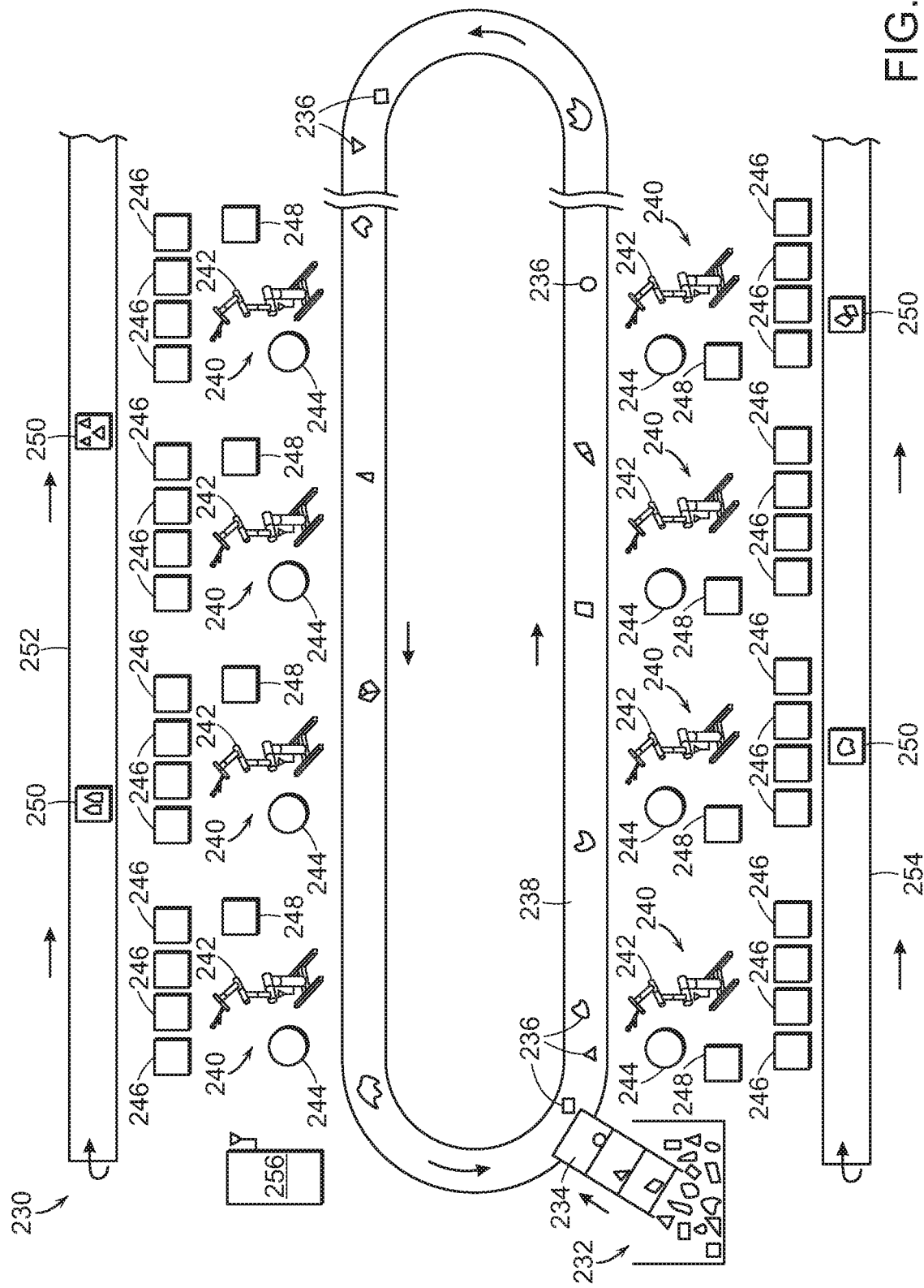
FIG. 10 shows an illustrative diagrammatic view of an object processing system in accordance with a further embodiment of the present invention including a large number of sorting stations as well as an automated input via a cleated conveyor.

In accordance with a further embodiment of the present invention, and with reference to FIG. 10, a system 230 includes multiple sorting stations 240, each of which includes a robot system 242, a perception unit 244, a plurality of destination locations (e.g., bins) 246, and a stack of additional bins 248 that may be used as bins 246 are moved or identified as being ready for further processing. In particular, input objects 236 are provided in an input hopper 232, and a cleated conveyor 234 draws the objects 236 up onto an input conveyor 238. Once on the conveyor 238, each of the robot systems 242 selects certain objects from the conveyor, again using any of perception units above the input conveyor (such as perception units 46, 47 and 63 of FIGS. 1 and 2), or perception units 111 and 121 of FIG. 3 that are mounted on the robots themselves, which facilitate the selection and grasping of the objects. Once any bins are full or otherwise considered to be completed, the bins 250 are loaded onto an output conveyor 252 for further processing, where the system knows the identity of each bin 252 as well as its contents as assigned by the central processor 256.

Figure 12:
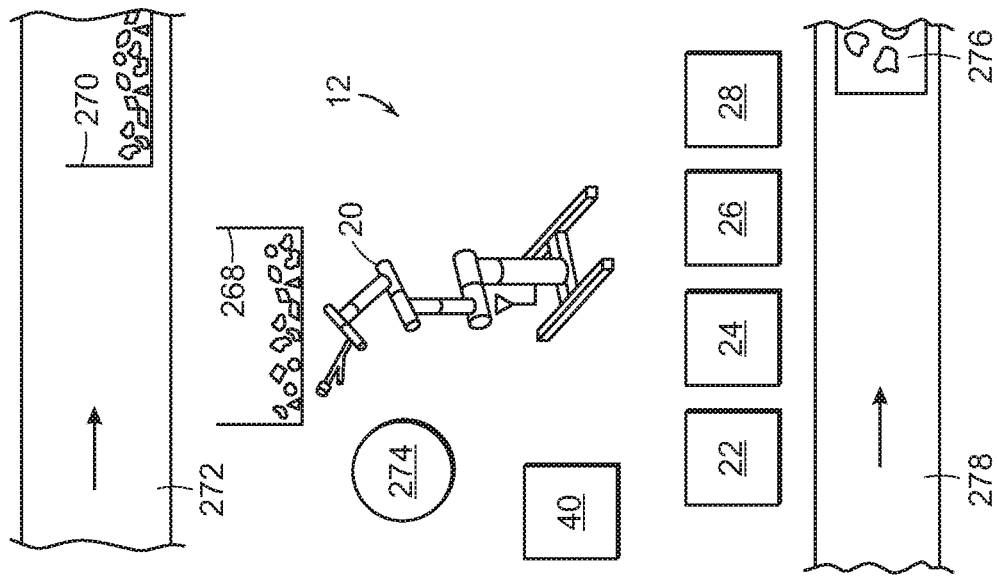
FIG. 12 shows an illustrative diagrammatic view of a portion of a system in accordance with a further embodiment of the present invention involving input bins provided on an input conveyor.
Figure 11:
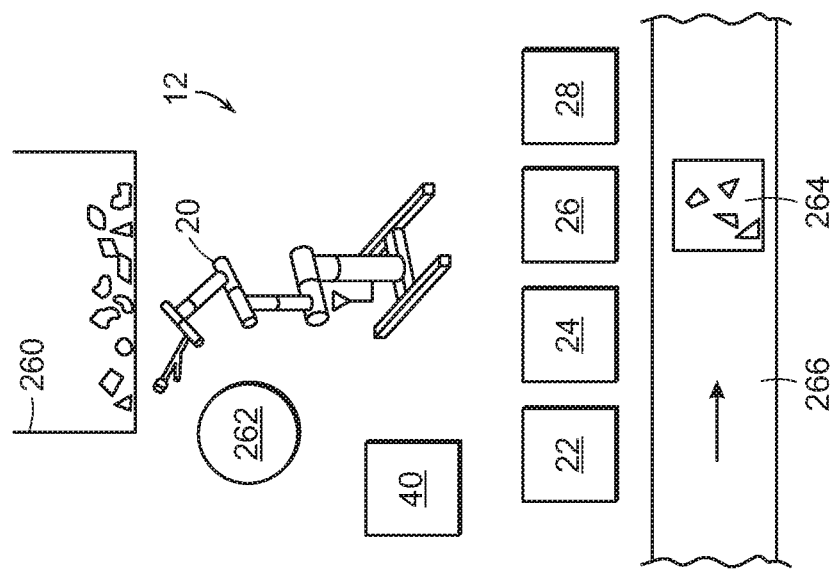
FIG. 11 shows an illustrative diagrammatic view of a portion of a system in accordance with a further embodiment of the present invention involving individual input bins.

In accordance with further embodiments, the input to each sorting station 12 may be provided in a movable hopper 260 that may be positioned by a human worker near to the robotic system 20 as shown in FIG. 11. The sorting system 12 of FIG. 11 may use a perception system 262 to identify objects (as well as any of perception units 46, 47, 63, 111, 121 discussed above), may fill bins 22, 24, 26, 28 with objects, and may provide filled or otherwise completed bins 264 onto the output conveyor 266. In accordance with a further embodiment, the input to each sorting station 12 may be provided in a hopper 268 that is one of a plurality of hoppers 268, 270 that are provided on an input conveyor 272 near to the robotic system 20 as shown in FIG. 8. The sorting system 12 of FIG. 12 may use a perception system 274 to identify objects (as well as any of perception units 46, 47, 63, 111, 121 discussed above), may fill bins 22, 24, 26, 28 with objects, and may provide filled or otherwise completed bins 276 onto the output conveyor 278.

Figure 14:
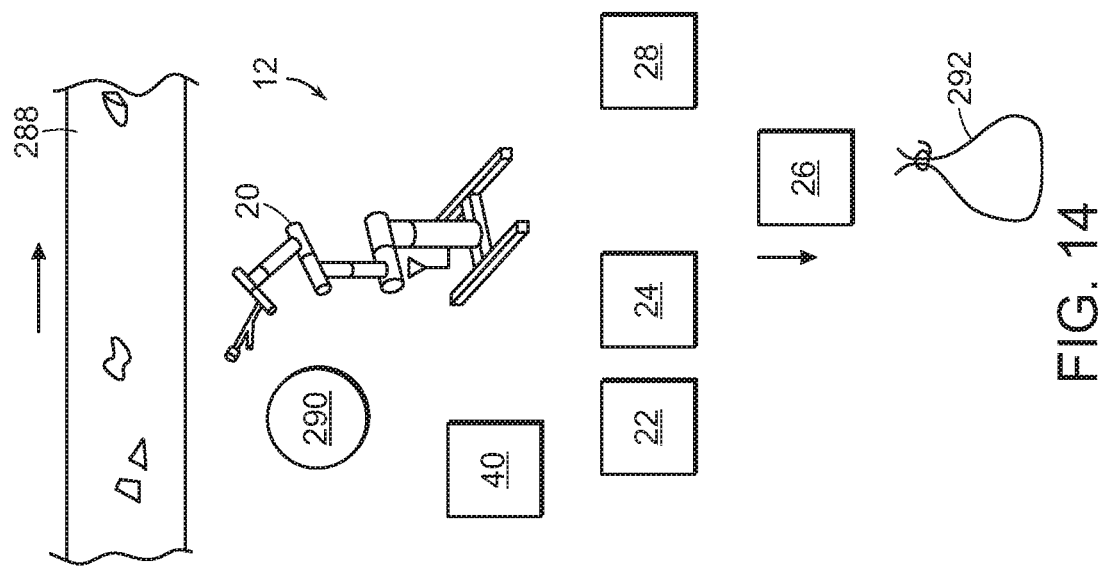
FIG. 14 shows an illustrative diagrammatic view of a portion of a system in accordance with a further embodiment of the present invention involving bagging objects at the sortation stations.
Figure 13:
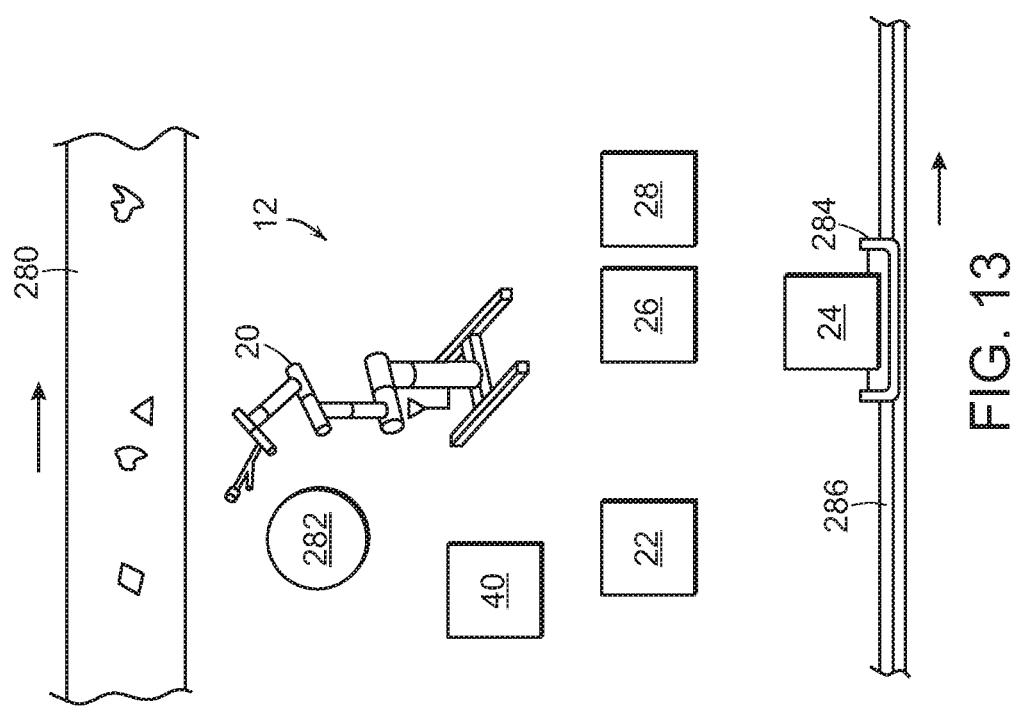
FIG. 13 shows an illustrative diagrammatic view of a portion of a system in accordance with a further embodiment of the present invention involving output carriages provided on an output track.

In accordance with a further embodiment, the input to each sorting station 12 may be provided by an input conveyor as discussed above with reference to FIG. 1, that is provided on an input conveyor 280 near to the robotic system 20 as shown in FIG. 13. The sorting system 12 of FIG. 13 may use a perception system 282 to identify objects (as well as any of perception units 46, 47, 63, 111, 121 discussed above), may fill bins 22, 24, 26, 28 with objects, and may provide filled or otherwise completed bins 24 onto an output carriage 284 that is mounted on an output track 286. In accordance with a further embodiment, the input to each sorting station 12 may be provided by an input conveyor as discussed above with reference to FIG. 1, that is provided on an input conveyor 288 near to the robotic system 20 as shown in FIG. 14. The sorting system 12 of FIG. 14 may use a perception system 290 to identify objects (as well as any of perception units 46, 47, 63, 111, 121 discussed above), may fill bins 22, 24, 26, 28 with objects, and may provide filled or otherwise completed bins 26 to a bagging station for bagging by human workers to provide sets of sorted objects in bags 292 for further processing by human workers.

Figure 15:
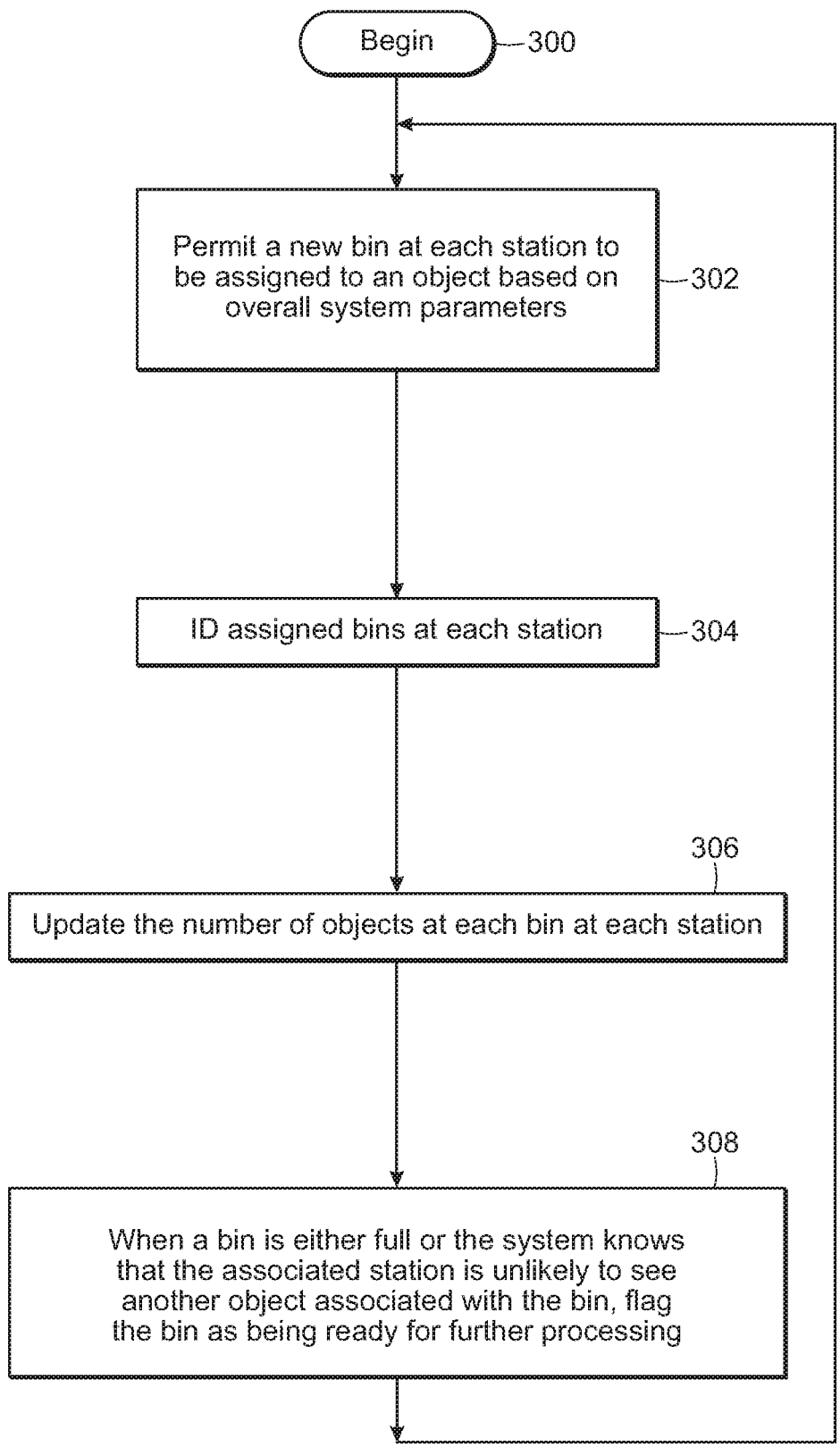
FIG. 15 shows an illustrative flowchart of an overall method of providing dynamic processing of objects.

A process of the overall control system is shown, for example, in FIG. 15. The overall control system may begin (step 300) by permitting a new collection bin at each station to be assigned to a group of objects based on overall system parameters (step 302) as discussed in more detail below. The system then identifies assigned bins correlated with objects at each station (step 304), and updates the number of objects at each bin at each station (step 306). The system then determines that when a bin is either full or the system expects that the associated sorting station is unlikely to see another object associated with the bin, the associated sorting station robotic system will then place the completed bin onto an output conveyor, or signal a human worker to come and empty the bin (step 308), and then return to step 302.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

In accordance with certain embodiments, therefore, the system provides a sortation system that employs a buffer at the infeed stage enabling scalable and flexible induction of objects into the system. The buffer may include a single conveyor, a circulating conveyor or multiple conveyors, possibly to separate disorganized objects from organized objects. In further embodiments, the invention provides a sortation system employing a plurality of sorters flexibly connected to both upstream and downstream processes. The system may also employ a flexible destination stage, including a process for dynamically changing the correspondence of sorter outputs and system destinations using a switch based on heuristics from the sortation process. The system may dynamically map sorter outputs to system destinations based on long-term historical usage trends and statistics, or items already processed, or current contents of other dynamically allocated sorter outputs, or average, minimum or maximum time-to-sort associated with each sorter output, or physical characteristics of the items sorted, or a priori information, or known future deliveries, or location within a facility, including the physical location relative to other allocated sorter outputs (e.g., above, beside, on or nearby), or incoming shipments, as well as knowing what items are currently upstream of the sortation process and combinations of the above. Further, systems of embodiments of the invention provide that information regarding correspondence between sorter outputs to system destinations may be provided to an automated system for sorting.

By making use of heuristics, the mapping of sorter outputs to system destinations can be improved substantially over traditional fixed allocation. Destinations may be assigned on the fly, reducing wasted space from unused sorter outputs and decreasing the time it takes to process incoming objects. Long-term historic trends may be used to allocate sorter outputs when the next incoming group of objects is either in-part or entirely unknown. Historical usage patterns provide insight into when objects bound for certain destinations can be expected to arrive, the number of objects bound for each destination expected for any given time, and the probable physical properties of these incoming objects.

In addition to trends pertaining to incoming objects, historical trends provide information on the speed at which objects can be sorted into outputs, and the rate at which outputs are transferred to system destinations. These factors allow sorter outputs to be allocated probabilistically until a deterministic understanding of incoming objects is achieved.

In addition to historic trends, an understanding of the current state of the system is used to ensure that there is an appropriate amount of space allocated for those objects that are expected to arrive. When combined with the knowledge of those objects that have already been sorted, the correspondence of sorter outputs to system destinations can typically be allocated deterministically. A knowledge of those objects already processed and the contents of current sorter outputs allows the system to optionally remap the sorter outputs once they have been emptied of their contents. In the case that there aren't enough sorter outputs, this knowledge also allows the system to specify which sorter outputs should be emptied such that they can quickly be reallocated to new system destinations.

A further consideration when dynamically allocating sorter outputs is to take into account the physical characteristics of the packages and the facility. If a certain destination is expected to receive larger, unwieldy objects, then an appropriately-sized sorter output can be allocated. If a particular system destination will require more than a single sorter output, then two adjacent outputs can be allocated with the same destination in order to facilitate human intervention.

A method is also presented for displaying the sorter output—system destination correspondence information next to the destinations. This allows human workers interacting with the system to understand how and when to properly empty the destinations. In addition, critical to autonomous sortation is the ability to send these destination allocations to a sortation system without human intervention. This allows for the construction of fully-streamlined sortation system software.

In accordance with further embodiments, systems of the invention may employ carriages that shuttle back and forth along shuttle directions. Such systems may rely on a pre-sortation step, where an object is sorted first to the correct sortation cell, and once there it is sorted into the proper collection bin. In this fashion, different cells can have different collection bin mappings, allowing the total number of system bins to be multiplied by the number of parallel cells operating. Such pre-sortation steps however, must be either complicated and expensive automated systems, or must rely on yet more human work; either way adds cost which raises the overall cost per divert of the system to unacceptably high levels.

In accordance with a further embodiment therefore, the invention provides a new approach to object sortation that yields a large (and very flexible) number of total collection bins, very low divert costs per bin, throughput as high as that of a manual system, and a far smaller need for manual labor to operate.

Figure 16:
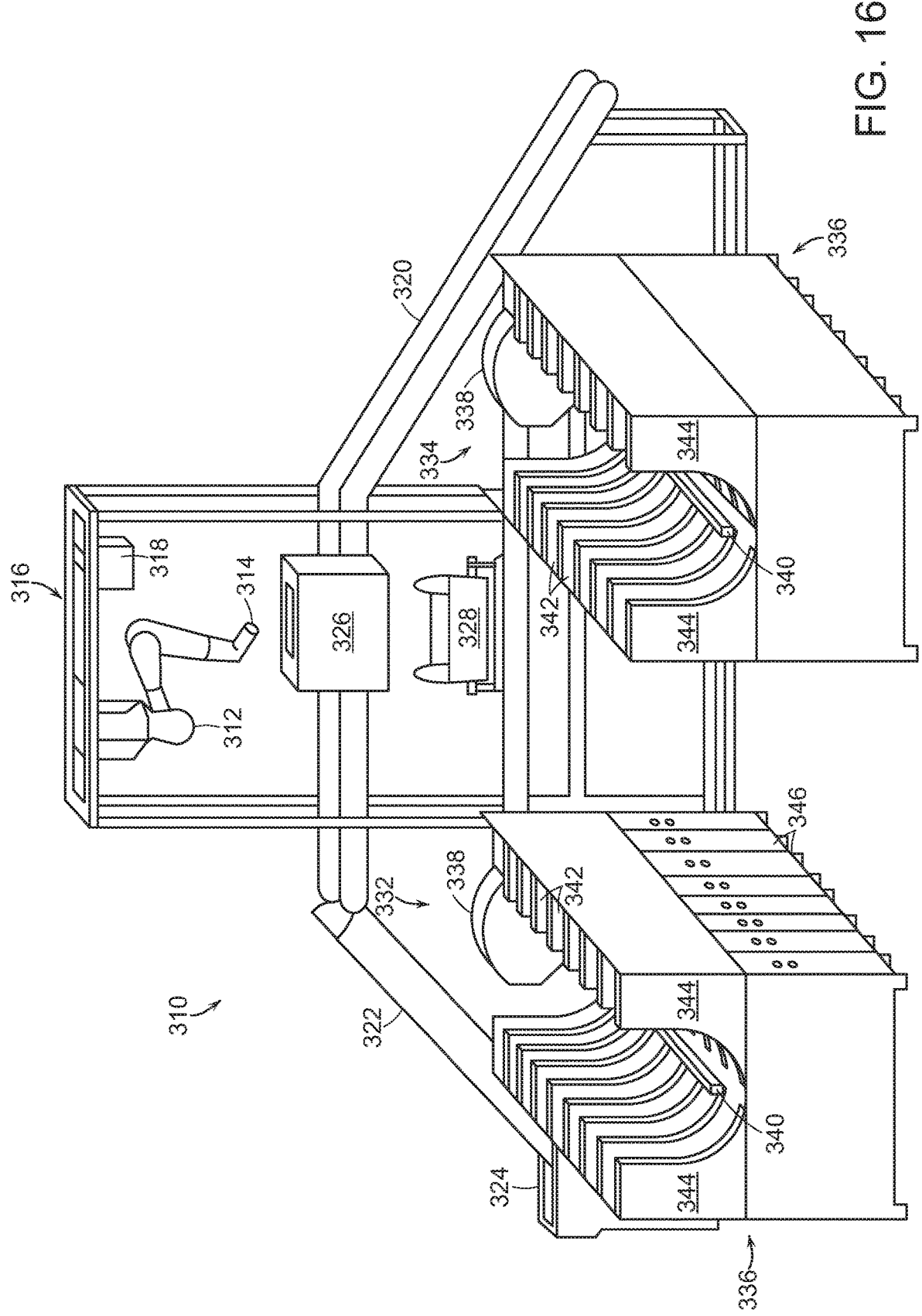
FIG. 16 shows an illustrative diagrammatic view of a system in accordance with a further embodiment of the present invention that includes shuttle wing sortation stations.

FIG. 16, for example, shows a system 310 that includes an articulated arm 312 with an end effector 314, an input area 316 in which objects are presented for sortation, a primary camera 318 for identifying objects to be sorted, and a receiving conveyor 320 for receiving objects to be sorted from any of a human worker, another conveyor, or an input pan. The system also includes a non-sortable output chute 322 that leads to a non-sortable output bin 324 for providing objects that the system either could not identify or could not sort for any other reason (e.g., could not grasp or pick up).

Figure 17:
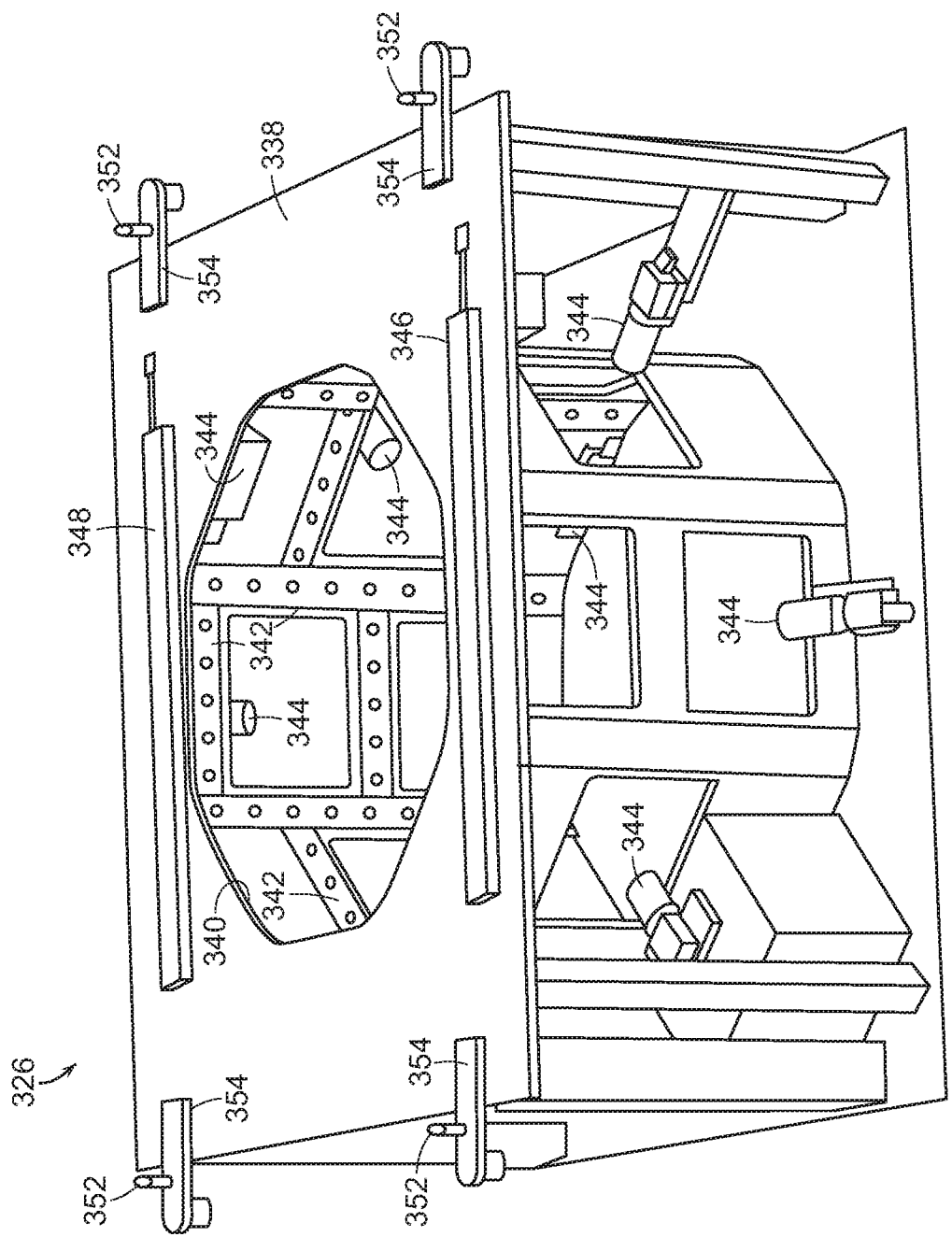
FIG. 17 shows an illustrative diagrammatic front isometric view of the perception system of the system of FIG. 16.
Figure 18:
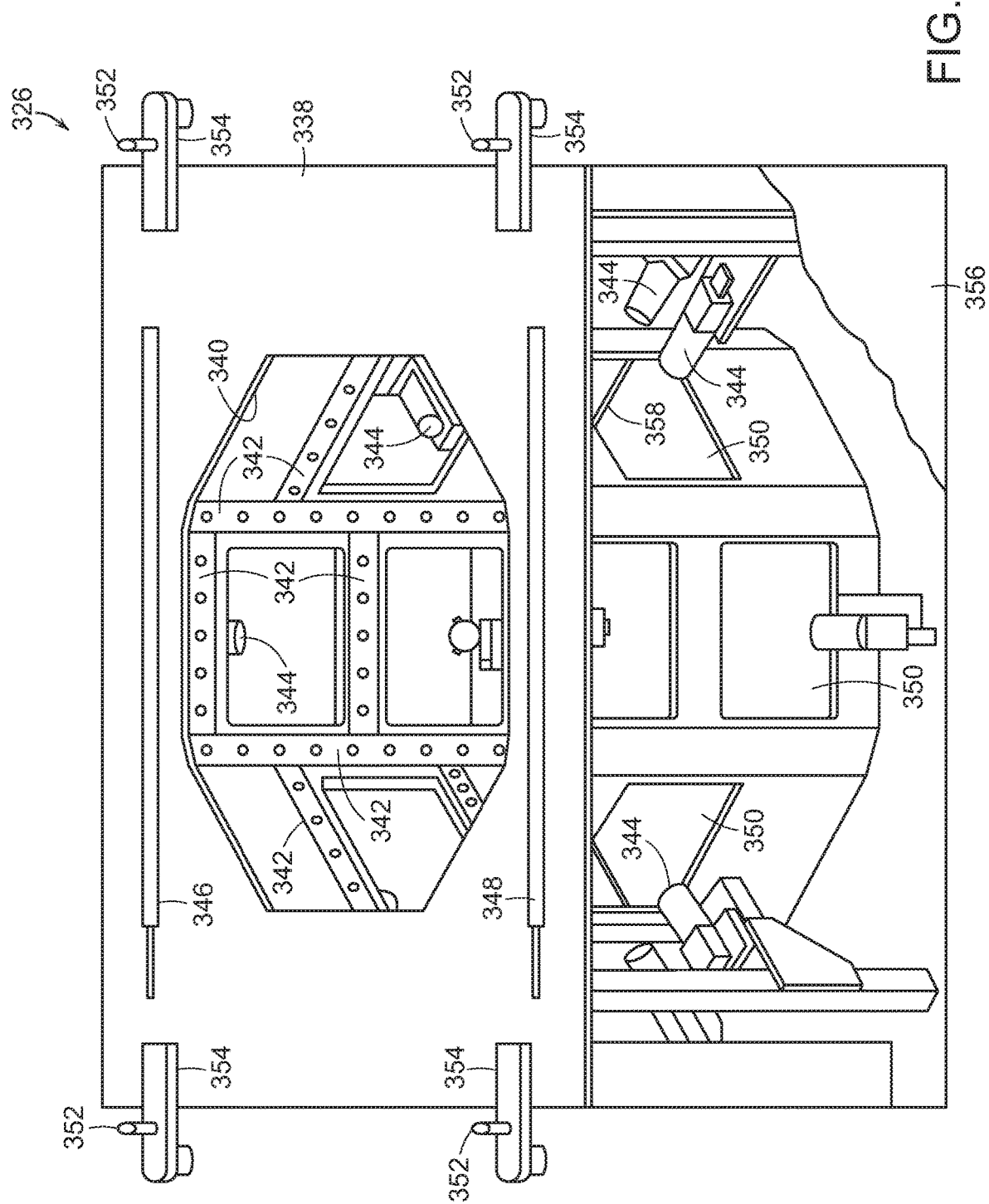
FIG. 18 shows an illustrative diagrammatic back view of the perception system of the system of FIG. 16.

In addition to the primary camera 318, the system also includes a drop camera unit 326, which includes an open top (340 as shown in FIGS. 17 and 18) and an open bottom (358 as shown in FIGS. 13 and 14) of the structure 338, and a plurality of cameras (344 as shown in FIGS. 17 and 18) positioned within the unit 326 that are aimed at the top, mid and lower central regions of the interior of the unit 326. In particular, and as further shown in FIGS. 17 and 18, the plurality of cameras 344 take images of an object when it is dropped by the end effector through the unit 326. The unit 326 also includes a plurality of sets of lights 342 that may become illuminated when certain of the cameras are activated, and the unit 326 may also include one or more sensors (e.g., laser sensors) at the top of the unit 216 that detect when an object is dropped into the unit 216 (as well as optional sensors to detect when the object has left the unit). The plurality of cameras 344 are designed to collect a plurality of images of each object from multiple views to aid in identifying or confirming the identity of the dropped object. Mounting hardware including rings 352 on brackets 354 may also facilitate the positioning of the unit 326 in the robotic environment.

Figure 19A:
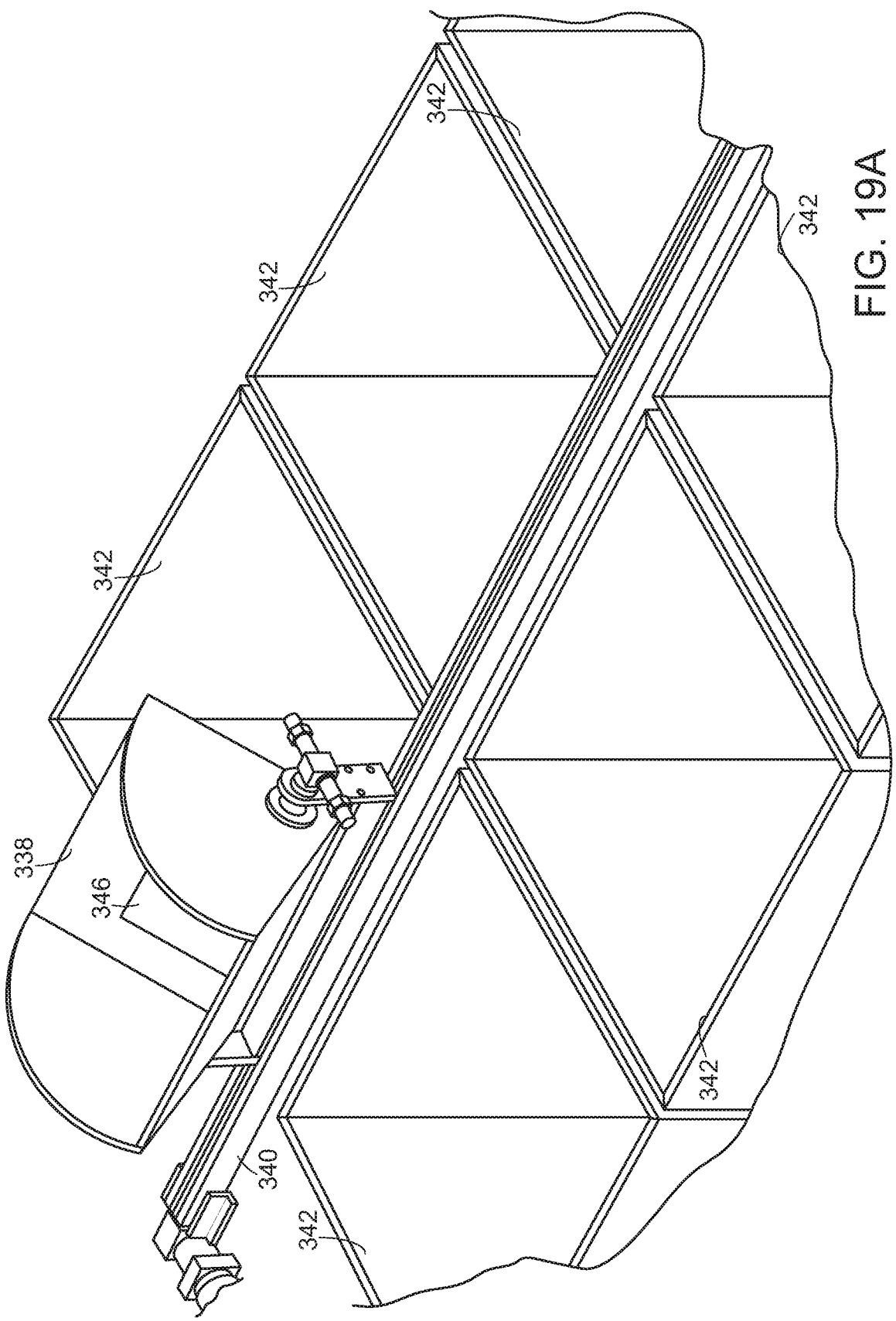
Figure 19C:
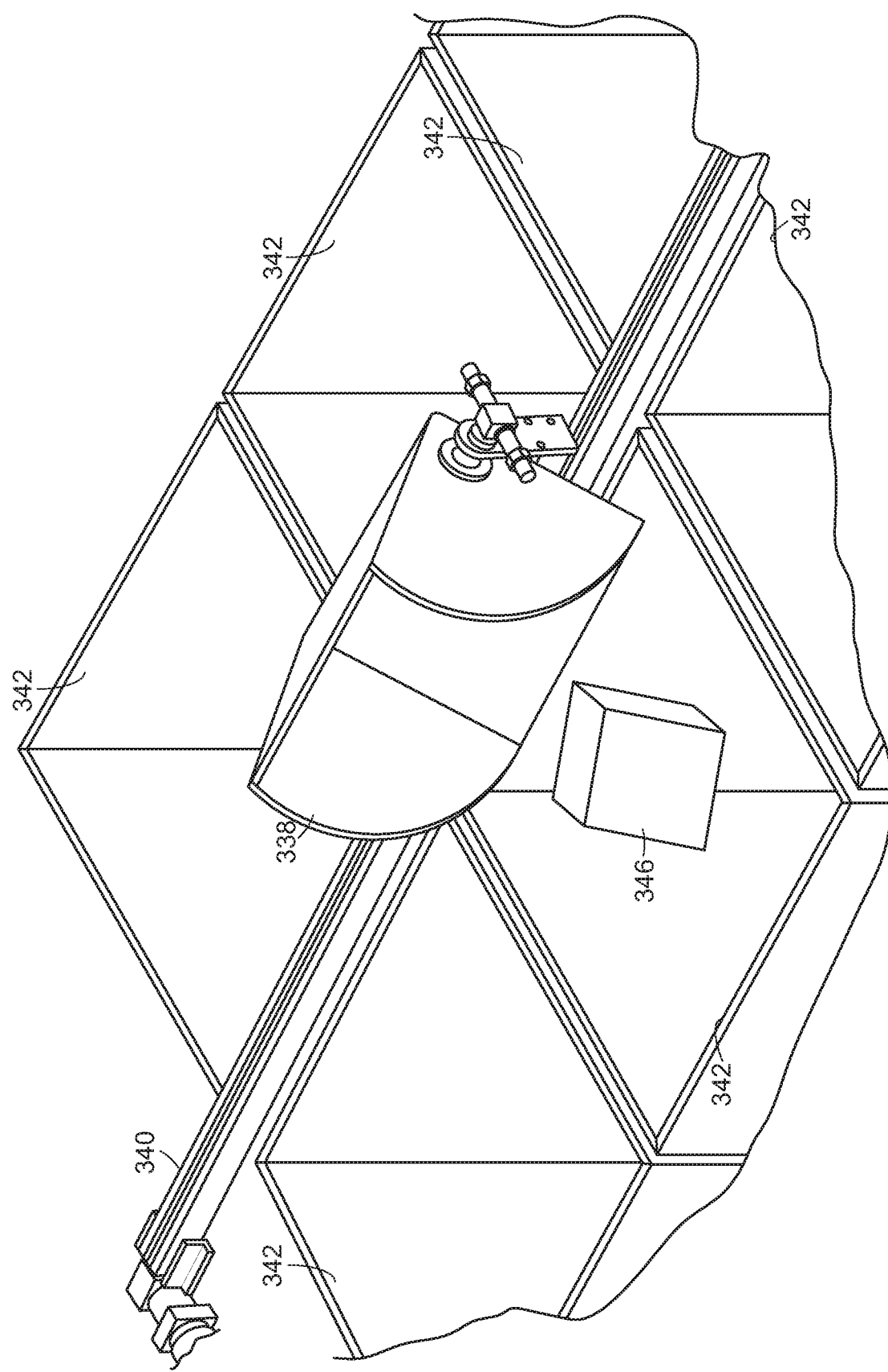

With reference again to FIG. 16, an object dropped through the perception unit 326 then falls into a first carriage 328 that is provided on a track 330 on which the carriage 328 may be reciprocally moved automatically between a first sortation stage 332 and a second sortation stage 334 on either side of the area in which the object was dropped. At each of the first sortation stage 232 and the second sortation stage 324, the content of the carriage 328 may be dropped into a further carriage 338 of either of two shuttle wing sorter sections 336. At each of the shuttle wing sorter sections 336, the carriage 338 reciprocally moves along a track 340 between sortation bins 342 that may optionally include associated side walls 344. As further shown in FIGS. 19A-19C, the carriage may move an object to be adjacent a designated sortation bin 342 (FIG. 19B), and may then be actuated to dump the object 346 from the carriage 338 onto the assigned destination bin (FIG. 19C). The movement of each carriage 328 and 338 (as well as the tipping of each carriage) may be effected by electrical power or pneumatics in various embodiments.

Figure 20:
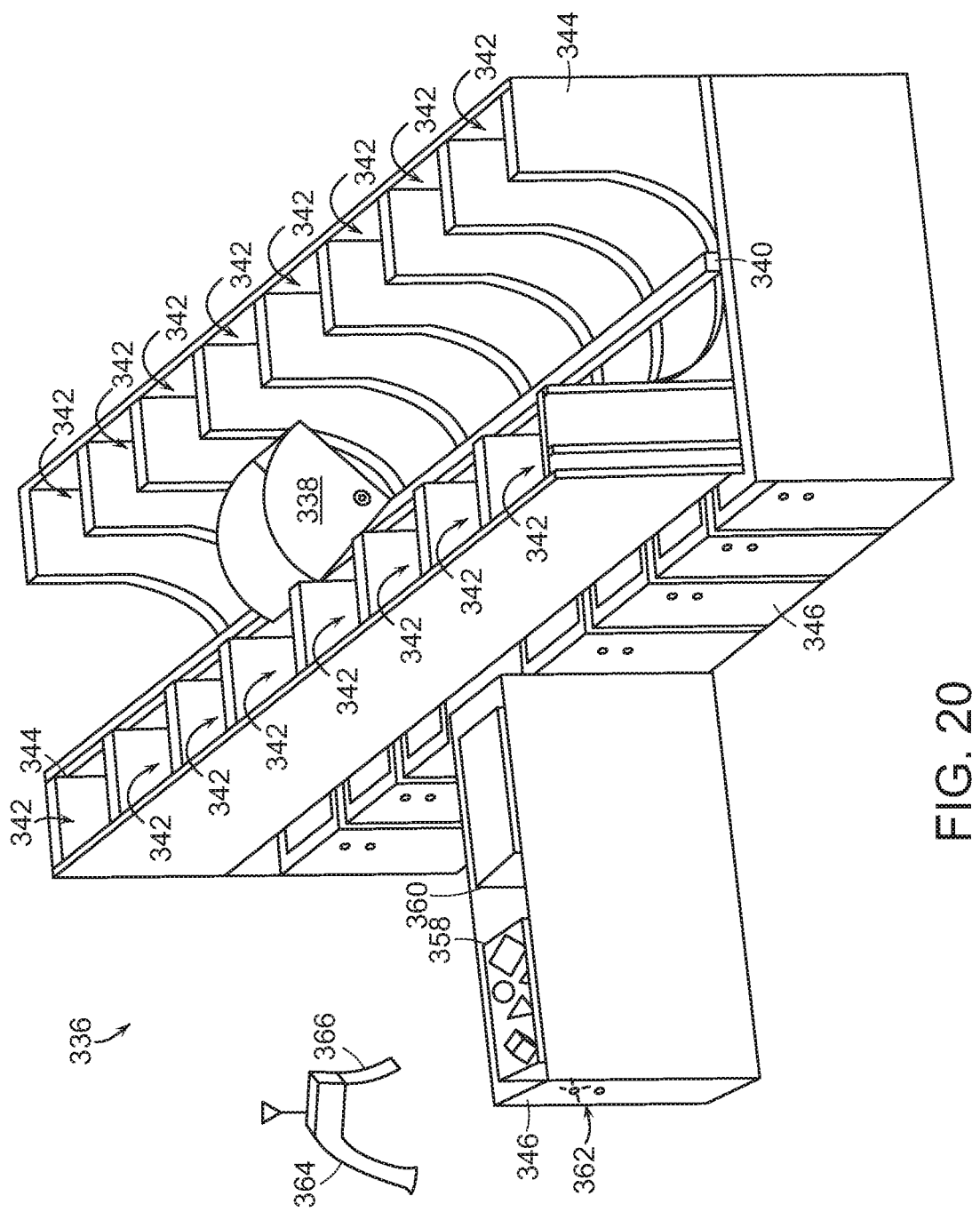
FIG. 20 shows an enlarged view of a shuttle wing sortation station of FIG. 16.

FIG. 20 shows a shuttle wing sorter section 336 that includes the carriage 338 on the track 338 between destination bins 342 within walls 344. As further shown in FIG. 20, the collection bins may be removed in pairs by sliding an associated drawer 346 that contains a pair of the collection bins (358, 360) in a direction transverse to the movement of the carriage 338. The drawer 346 may also include lights 362 that indicate whether either of the contained bins, e.g., 358, 360) is full or otherwise ready for further processing, e.g., by placing into a bag. A hand-held scanner/printer 364 may also be provided so that coded adhesive-backed labels 366 may be provided directly to a bag that contains the processed objects.

The system of FIG. 16 shows a system with two shuttle wings sections 336. When an object is picked from the infeed conveyor, it is dropped onto the first shuttle sorter 328. That shuttle sorter carries the object to one of two wings, drops the object in the carrier for that wing, and then moves back to home. Due to the limited travel, this back and forth operation may be performed in the time it takes the articulated arm to pick another object (assuming the articulated arm is picking objects at approximately a human rate of throughput).

The shuttle sort wing therefore includes an object carriage on a motorized linear slide that travels above a double row of bins. The carriage is loaded with an object and then moves down the wing along the linear slide until it has reached the collection bin where the object belongs; it then uses rotational actuation to eject the object to one side or the other, where it falls into one of the two cubbies at that location. The carrier then returns to the home position to await another object.

In the concept as shown, each wing is limited to 8 collection bins long, for 16 total collection bins per wing. The length of collection bins traveled by the linear carriage should be balanced with other throughput factors in the system. Given achievable speeds for belt driven linear actuators, distances, and picking speed of the articulated arm, this length of 8 collection bins is a reasonable length that does not adversely limit system throughput (i.e., the articulated arm does not have to wait for a wing shuttle sorter to return to home before picking another object). At this 8×2 or 16 collection bin count, each wing has a divert cost in the hundreds of dollars, as opposed to the thousands of dollars, per intelligent divert for currently fielded solutions, as discussed above.

Systems in the prior art also do not use back and forth style sortation because the shuttle can only handle one item at a time, and the shuttle needs to return to its home position after each sort. In accordance with certain embodiments of the present invention, this concern is alleviated in three ways: 1) multiple wings are used in parallel, 2) frequent destinations are assigned to collection bins closer to the shuttle's home position, thereby reducing the average cycle time of the shuttle, and 3) mapping of objects to collection bins is dynamic and under the control of the system as discussed above.

Figure 21:
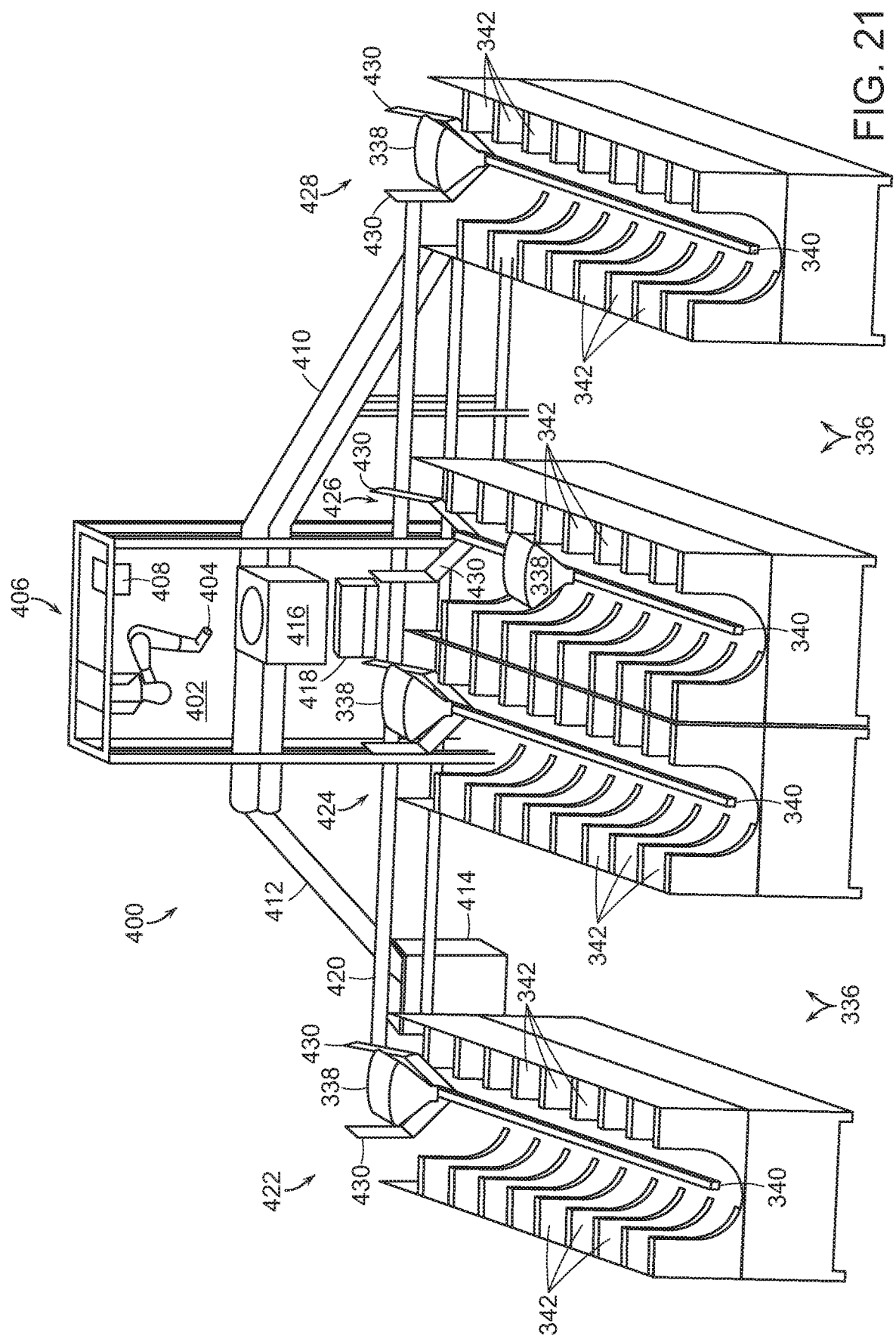
FIG. 21 shows an illustrative diagrammatic view of a system in accordance with a further embodiment of the present invention that includes four shuttle wing sortation stations.

FIG. 21 shows a system 400 in accordance with a further embodiment of the present invention that includes an articulated arm 402 with an end effector 404, an input area 406 in which objects are presented for sortation, a primary camera 308 for identifying objects to be sorted, and a receiving conveyor 410 for receiving objects to be sorted from any of a human worker, another conveyor, or an input pan. The system also includes a non-sortable output chute 412 that leads to a non-sortable output bin 414 for providing objects that the system either could not identify or could not sort of any other reason (e.g., could not grasp or pick up).

The system also includes a drop camera unit 416, which includes an open top and an open bottom, as well as a plurality of cameras positioned within the unit 416 that are aimed at the top, mid and lower central regions of the interior of the unit 416 as discussed above with reference to FIGS. 16-20. The dropped object then falls into a first carriage 418 that is provided on a track 420 on which the carriage 418 may be moved automatically between a first sortation stage 422, a second sorting station 424, a third sorting station 426 and a fourth sorting station 428. The first sortation station 422 includes a second carriage 338 that may receive objects from the first carriage 418, and which travels along a track 340 between two rows of collection bins 432. The second sortation station 324 (as well as each of the stations 326 and 328) each includes a carriage 338 that may receive objects from the first carriage 418, and which travels along a track 340 between two rows of collection bins 336. Again, the collection bins may be removed in pairs by sliding a pair of the collection bins in a direction transverse to the movement of the associated carriage as discussed above with reference to FIG. 20.

The system 400 therefore includes 64 total collection bins. This system may be further scaled to add more collection bins. The first shuttle sorter (that transfers objects from the picking robot to the wings) may also be lengthened to accommodate 4 shuttle sort wings before system throughput is adversely affected. In particular, the system may be further expanded by again doubling the number of wings. This requires the addition of another shuttle sorter that takes the object from the picking robot and delivers it to one of the 4 wing systems. This keeps the shuttle sort back and forth travel time from adversely effecting overall system throughput.

Figure 22:
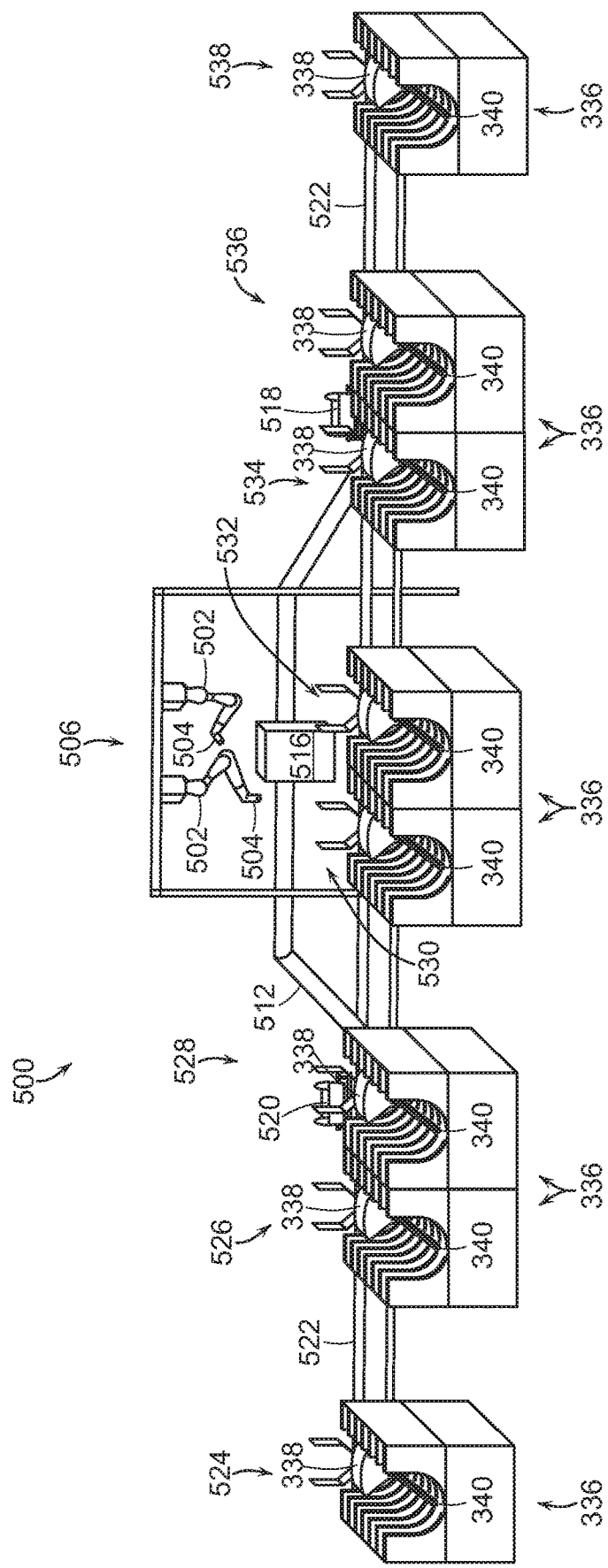
FIG. 22 shows an illustrative diagrammatic view of a system in accordance with a further embodiment of the present invention that includes eight shuttle wing sortation stations.

Such a system is shown here in FIG. 22. In particular, FIG. 22 shows a system 500 that includes two independent articulated arms 552 having an end effector 554 in an input area 506, a primary carriage 520 on a track 522, as well as eight sortation stations 524, 526, 528, 530, 532, 564, 536 and 538. In each of these sortation stations, a carriage 338 is able to travel along its track 340 so as to access bins 342 as discussed above. The carriage 520 may be permitted to travel in a direction far enough to reach both the input conveyor 534 as well as the non-sortable output chute 512, which provides that the system may elect to send an object in the first carriage to either the input conveyor to be re-processed, or to the non-sortable output chute if the object is not sortable.

The systems 400 and 500 also provides, in each embodiment, dynamic collection bin allocation as discussed above. In typical human manned systems, collection bins are statically associated (to destinations, next stop facilities, customers, etc.) and don't change frequently; this is so that efficiency benefits, may be gained by humans learning the association and cubby locations. In the systems of the invention, no such constraints exist, since the system is placing all of the objects in collection bins, and it always has comprehensive knowledge of which objects are in the system, which are in each bin, etc. The system also has knowledge of all historical sortation activity, meaning that historical trends can be used to make even smarter choices about collection bin allocation.

In the simplest example, and with reference again to the two wing system shown in FIG. 10, if the historical data suggests that two of the collection bins in this system get the most objects in each sort cycle, then the system will allocate one of these bins to the first wing, and one to the second, thus ensuring that all the high volume bins are not on one wing creating a bottleneck. The system may also allocate bins close to the beginning of the wing, thereby ensuring minimum cycle times for the busiest collection bins. Lastly, if the system needs an empty bin, it can signal to a human operator to come and empty a given bin, allowing that bin to be used as soon as it is emptied. These strategies ensure that the cycle time of the shuttle sort wings does not impact overall system throughput.

Finally, the system may also allocate and group objects so as to maximize any other arbitrary cost function. Such a sortation system is typically a small part of a large system, usually extending across multiple facilities around the state, country, or world. As a part of such a large network, the performance of this system inevitably has impacts on costs elsewhere in the network. By understanding these impacts, the system presented herein may allocate objects to collection bins in order to minimize cost impact elsewhere in the macro network.

In this system concept, additional articulated arms (robots) may also be added to each of the concepts to scale throughput for the system. Typically, the number of robots R must be less than or equal to HALF of the number of wings W for the wing shuttle cycle time to not be the limiter to system throughput. Below this number of robots, throughput scales linearly. By adding robots and shuttle sort wings, and tuning shuttle sorter speeds and robot picking/scanning speeds, a wide range of overall system throughputs and cubby counts are possible using the same basic architecture.

For further scaling eight wings fed by one pick/scan station is the practical maximum. To scale max bins and max throughput beyond this, multiple of these stations can be parallelized and fed by manual or automated means, just as manual sort cells are fed in concepts discussed in the prior art. This allows for continued linear scaling of throughput, as well as for greater numbers of collection bins, since the system can now dynamically allocate between all the bins in all the wings in all of the parallel cells.

Those skilled in the art will appreciate that numerous modifications and variations may be made to the above disclosed embodiments without departing from the spirit and scope of the present invention.

What is claimed is:

1. A method of processing objects using a programmable motion device, said method comprising:
    providing a plurality of intermediate containers, each of which is unassigned to any destination;
    acquiring with the programmable motion device an acquired object from a plurality of mixed objects at an input area;
    perceiving with a perception system first identifying indicia in connection with the acquired object;
    assigning, using a computer processing system, assigment data representative of a first intermediate container among the plurality of intermediate containers to a first destination for the acquired object responsive to the first identifying indicia in connection with the acquired object;
    moving the acquired object to the first intermediate container responsive to the assignment data;
    acquiring with the programmable motion device a next object from the plurality of mixed objects at the input area;
    perceiving with the perception system second identifying indicia in connection with the next object;
    assigning, using the computer processing system, a second intermediate container among the plurality of intermediate containers to a second destination for the next object responsive to the second identifying indicia in connection with the next object when the first destination is different than the second destination; and
    moving the next object to one of the first destination and the second destination.

2. The method as claimed in claim 1, wherein the method further includes dynamically assigning additional intermediate containers to additional destinations for additional objects responsive to identifying indicia in connection with each of the additional objects.

3. The method as claimed in claim 1, wherein said method further includes changing a status of an intermediate container to finished when the intermediate container is full.

4. The method as claimed in claim 1, wherein said method further includes generating a signal to empty the first intermediate container before the container is full and identifying the emptied first intermediate container as available for re-assignment, by the computer processing system, when the number of objects expected to arrive indicates that the first intermediate container is not expected to receive another object bound for the first destination currently assigned to the first intermediate container within a given time.

5. The method as claimed in claim 1, wherein said method further includes assigning the second intermediate container to the destination location.

6. The method as claimed in claim 1, wherein each intermediate container is not assigned to a destination until an object is processed that becomes associated with the destination.

7. The method as claimed in claim 1, wherein said input area includes a circulating conveyor that interfaces with the programmable motion device.

8. The method as claimed in claim 1, wherein said input area includes a designated space into which a human worker may place objects to be sorted.

9. The method as claimed in claim 1, wherein said input area includes a plurality of input cleated conveyors.

10. The method as claimed in claim 1, wherein assigning the first intermediate container among the plurality of intermediate containers to the first destination is based on long-term historical usage trends and statistics.

11. The method as claimed in claim 1, wherein assigning the first intermediate container among the plurality of intermediate containers to the first destination is based on future delivery requirements or sortation processes.

12. The method as claimed in claim 1, wherein assigning the first intermediate container among the plurality of intermediate containers to the first destination is based on perception data regarding objects that are upstream of the input area.

13. The method as claimed in claim 1, wherein assigning the first intermediate container among the plurality of intermediate containers to the first destination is based on data regarding objects that have already been processed and each assigned to a specific one of the plurality of intermediate containers.

14. The method as claimed in claim 1, wherein assigning the first intermediate container among the plurality of intermediate containers to the first destination is based on objects currently being sorted by a plurality of programmable motion devices.

15. The method as claimed in claim 1, wherein assigning the first intermediate container among the plurality of intermediate containers to the first destination is based on time-to-sort information.

16. The method as claimed in claim 1, wherein assigning the first intermediate container among the plurality of intermediate containers to the first destination is based on physical characteristics of objects to be sorted.

17. The method as claimed in claim 1, wherein assigning the first intermediate container among the plurality of intermediate containers to the first destination is based on information regarding locations within a facility at which objects may be processed.

18. The method as claimed in claim 1, wherein said method further includes using the programmable motion device to acquire a new intermediate container to replace another intermediate container.

19. The method as claimed in claim 1, wherein said programmable motion device includes a robotic system.

20. The method as claimed in claim 19, wherein said robotic system receives objects via a single input conveyor that passes a plurality of robotic systems.

21. The method as claimed in claim 19, wherein acquiring the object includes using an end effector of the robotic system to select and grasp the object from the plurality of mixed objects.

22. The method as claimed in claim 1, wherein said method further includes moving an intermediate container containing objects toward a dynamically assigned destination using an automated routing conveyor.

23. The method as claimed in claim 22, wherein said automated routing conveyor passes near each of a plurality of programmable motion devices.

24. An object processing system comprising:
at least one programmable motion device for acquiring an acquired object to be processed from an input station;
a perception system, wherein the at least one programmable motion device presents the object to the perception system for perceiving identifying indicia on the acquired object;
a plurality of intermediate containers, each of which is initially unassigned to any destination;
a computer processing system for generating assignment data regarding an assigned intermediate container among the plurality of intermediate containers regarding a destination for the acquired object responsive to the identifying indicia in connection with the acquired object, said computer processing system including a non-transitory machine-readable medium for storing the assignment data regarding the assigned intermediate container; and
an automated transport system for moving the acquired object to the assigned intermediate container.

25. The object processing system as claimed in claim 24, wherein the automated carriage includes a reciprocating carriage.

26. The object processing system as claimed in claim 24, wherein said reciprocating carriage travels between two sets of intermediate containers.

27. The object processing system as claimed in claim 24, wherein said input station includes an input cleated conveyor on which objects are provided to be sorted.

28. The object processing system as claimed in claim 24, wherein said input station includes a primary scanner system for identifying indicia relating to a plurality of objects.

29. The object processing system as claimed in claim 24, wherein said reciprocating carriage is able to dump any contents of the carriage in a direction transverse to a direction of movement of the reciprocating carriage.

30. The object processing system as claimed in claim 24, wherein said object processing system includes at least two programmable motion devices, and each programmable motion device includes a robotic system.

31. The object processing system as claimed in claim 24, wherein said reciprocating carriage travels between a first sortation station and a second sortation station.

32. The object processing system as claimed in claim 31, wherein said first sortation system includes a first automated carriage that is able to dump any contents therein in a direction transverse to a direction of movement of the first automated carriage, and wherein said second sortation system includes a second automated carriage that is able to dump any contents therein in a direction transverse to a direction of movement of the second automated carriage.

33. The object processing system as claimed in claim 24, wherein said input station includes an output chute for providing a further acquired object for which the perception system is not able to perceive identifying indicia.

34. The object processing system as claimed in claim 33, wherein said reciprocating carriage is further movable to the output chute such that the further acquired object may be moved to the output chute by the first automated carriage.

35. The object processing system as claimed in claim 24, wherein said input station includes a second scanner system that includes multiple scanners.

36. The object processing system as claimed in claim 35, wherein said multiple scanners of said second scanning system are positioned to scan the acquired object as it is falling.

37. A method of processing objects, said method comprising:
provide a plurality of intermediate containers, each of which is unassigned to any destination;
acquiring an object to be sorted from an input station;
identifying the acquired object by determined indicia associated with the acquired object;
identifying, using a computer processing system, an assigned destination for the acquired object;
determining, using the computer processing system, a number of objects expected to arrive at the input station within a given time bound for the assigned destination;
assigning, using the computer processing system, assignment data representative of an assigned intermediate container to the acquired object responsive to the number of objects expected to arrive at the input station within the given time bound for the assigned destination;
storing the assignment data in a non-transitory machine-readable medium; and
moving the object to the assigned intermediate container.

38. The method as claimed in claim 37, wherein identifying the acquired object includes scanning the acquired object with a plurality of cameras as the acquired object is falling.

39. The method as claimed in claim 37, wherein said method further includes generating a signal to empty the assigned intermediate container before the assigned intermediate container is full and identifying the emptied intermediate container as available for re-assignment, by the computer processing system, when the number of objects expected to arrive indicates that the intermediate container is not expected to receive another object bound for the destination currently assigned to the intermediate container within the given time.

40. The method as claimed in claim 37, wherein moving the acquired object to the assigned intermediate container includes moving the acquired object using an automated carriage along a track to the assigned intermediate container.

41. The method as claimed in claim 40, wherein the track runs between a first sortation station and a second sortation station.

* * * * *